United States Patent
Rendusara et al.

(10) Patent No.: US 10,876,393 B2
(45) Date of Patent: Dec. 29, 2020

(54) SUBMERSIBLE ELECTRICAL SYSTEM ASSESSMENT

(71) Applicant: Sensia LLC, Houston, TX (US)

(72) Inventors: Dudi Rendusara, Katy, TX (US); Andrew Meredith, Cambridge (GB); Emmanuel Coste, Houston, TX (US); Leo Steenson, Cambridge (GB); Albert Hoefel, Sugar Land, TX (US)

(73) Assignee: Sensia LLC, Houston, TX (US)

( * ) Notice: Subject to any disclaimer, the term of this patent is extended or adjusted under 35 U.S.C. 154(b) by 189 days.

(21) Appl. No.: 15/312,559

(22) PCT Filed: May 22, 2015

(86) PCT No.: PCT/US2015/032197
§ 371 (c)(1),
(2) Date: Nov. 18, 2016

(87) PCT Pub. No.: WO2015/179775
PCT Pub. Date: Nov. 26, 2015

(65) Prior Publication Data
US 2017/0089192 A1 Mar. 30, 2017

Related U.S. Application Data

(60) Provisional application No. 62/002,596, filed on May 23, 2014, provisional application No. 62/004,799, filed on May 29, 2014.

(51) Int. Cl.
*E21B 47/008* (2012.01)
*F04D 13/10* (2006.01)
(Continued)

(52) U.S. Cl.
CPC .......... *E21B 47/008* (2020.05); *E21B 43/128* (2013.01); *E21B 47/12* (2013.01);
(Continued)

(58) Field of Classification Search
CPC .... F04D 15/00; F04D 15/0077; E21B 47/008; H04B 2203/5475; G05B 17/00
See application file for complete search history.

(56) References Cited

U.S. PATENT DOCUMENTS

| 4,821,580 A | 4/1989 | Jorritsma |
| 5,353,646 A | 10/1994 | Kolpak |

(Continued)

FOREIGN PATENT DOCUMENTS

| EP | 2 120 329 A2 | 11/2009 |
| WO | 2009079363 A2 | 6/2009 |
| WO | WO-2012/039845 A2 | 3/2012 |

OTHER PUBLICATIONS

PCT/US2015/032197 International Search Report and Written Opinion, dated Aug. 6, 2015, 11 pgs.
(Continued)

*Primary Examiner* — Matthew G Marini
(74) *Attorney, Agent, or Firm* — Foley & Lardner LLP

(57) ABSTRACT

A method can include receiving sensor information from at least one sensor disposed in a downhole environment that includes an electric submersible pump operatively coupled to a power drive via a cable; receiving electrical information associated with transmission of power via the cable; and identifying a state of the electric submersible pump via an adaptive model of at least the cable and the electric submersible pump based at least in part on a portion of the sensor information and a portion of the electrical information.

20 Claims, 20 Drawing Sheets

(51) Int. Cl.
  *E21B 43/12* (2006.01)
  *F04D 15/00* (2006.01)
  *E21B 43/24* (2006.01)
  *E21B 47/12* (2012.01)
  *H02P 27/08* (2006.01)

(52) U.S. Cl.
  CPC ......... *F04D 13/10* (2013.01); *F04D 15/0077* (2013.01); *F04D 15/0088* (2013.01); *E21B 43/2406* (2013.01); *H02P 27/08* (2013.01)

(56) References Cited

U.S. PATENT DOCUMENTS

| | | | |
|---|---|---|---|
| 5,466,127 A | 11/1995 | Arnswald | |
| 5,668,420 A | 9/1997 | Lin et al. | |
| 6,587,037 B1 * | 7/2003 | Besser | E21B 43/128 340/538.11 |
| 6,590,362 B2 | 7/2003 | Parlos et al. | |
| 6,713,978 B2 | 3/2004 | Parlos et al. | |
| 7,024,335 B1 | 4/2006 | Parlos | |
| 7,117,120 B2 | 10/2006 | Beck et al. | |
| 7,258,164 B2 | 8/2007 | Rezgui et al. | |
| 7,558,699 B2 | 7/2009 | Beck et al. | |
| 8,672,641 B2 | 3/2014 | Yuratich | |
| 2002/0000783 A1 | 1/2002 | MacEratini et al. | |
| 2004/0064292 A1 | 4/2004 | Beck et al. | |
| 2005/0031443 A1 | 2/2005 | Ohlsson et al. | |
| 2005/0216229 A1 | 9/2005 | Hung et al. | |
| 2006/0052903 A1 | 3/2006 | Bassett | |
| 2006/0259271 A1 | 11/2006 | House et al. | |
| 2007/0150113 A1 | 6/2007 | Wang et al. | |
| 2007/0221173 A1 | 9/2007 | Hazama | |
| 2008/0067116 A1 * | 3/2008 | Anderson | E21B 47/042 210/100 |
| 2008/0260540 A1 | 10/2008 | Koehl | |
| 2008/0262737 A1 * | 10/2008 | Thigpen | E21B 43/00 702/9 |
| 2009/0000789 A1 | 1/2009 | Leuthen et al. | |
| 2009/0044938 A1 * | 2/2009 | Crossley | E21B 43/128 166/250.15 |
| 2009/0173166 A1 | 7/2009 | Genosar | |
| 2009/0223662 A1 | 9/2009 | Shaw et al. | |
| 2010/0169030 A1 | 7/2010 | Parlos | |
| 2010/0228502 A1 | 9/2010 | Atherton | |
| 2010/0247335 A1 | 9/2010 | Atherton | |
| 2011/0088484 A1 | 4/2011 | Camilleri | |
| 2011/0102012 A1 | 5/2011 | Messersmith et al. | |
| 2011/0106452 A1 | 5/2011 | Anderson et al. | |
| 2011/0297391 A1 | 12/2011 | Fielder et al. | |
| 2012/0076667 A1 | 3/2012 | Patient | |
| 2012/0091931 A1 | 4/2012 | Beck et al. | |
| 2012/0098477 A1 | 4/2012 | Gao et al. | |
| 2012/0100014 A1 | 4/2012 | Seitter | |
| 2012/0153883 A1 * | 6/2012 | Hammel | H02P 6/18 318/400.33 |
| 2013/0038123 A1 * | 2/2013 | Wilkins | H02J 3/01 307/18 |
| 2013/0272898 A1 * | 10/2013 | Toh | F04D 15/00 417/44.1 |
| 2014/0039836 A1 | 2/2014 | Moricca et al. | |
| 2014/0121973 A1 * | 5/2014 | Buchanan | G05B 23/0221 702/6 |
| 2016/0006481 A1 | 1/2016 | Rendusara et al. | |
| 2017/0089192 A1 | 3/2017 | Rendusara et al. | |

OTHER PUBLICATIONS

2007 ESP Workshop Agenda, ESP Workshop: Apr. 26, 2007, The Woodlands, TX, 3 pgs.
William D. Bolin, Using the Calibrated-Tested Pumping Instrument (Electrical Submersible Pump) For Continuous Fluid Measurement When Producing heavy Oil Wells; ESP Workshop, Apr. 26, 2007, The Woodlands, TX, 8 pgs.
Camilleri et al, "First Installation of Five ESPs Offshore Romania—A Case Study and Lesson Learned", Petrom ESP paper_Lawrence 2009, 4809408, pp. 1-22.
Camilleri et al, "First Installation of Five ESPs Offshore Romania—A Case Study and Lesson Learned", ESP paper-Lawrence 2010 SPE 127593, pp. 1-25.
Camilleri et al, "First Installation of five ESPs Offshore Romania—A Case Study and Lesson Learned", Petrom_ESP, Apr. 29-May 1, 2009, pp. 1-22.
Olsen, et al, "Production Allocation Using ESP in the Peregrino Field" SPE Gulf Coast Section Electric Submersible Pump Workshop, The Woodlands, TX Apr. 25-29, 2011 (13 pgs).
International Search Report and Written Opinion on PCT/US2015/027411 dated Aug. 4, 2015. 17 Pages.

* cited by examiner

System 1600

System 1700

System 1800

Assessment and/or Life Prediction Computation System 1880

US 10,876,393 B2

SUBMERSIBLE ELECTRICAL SYSTEM ASSESSMENT

RELATED APPLICATIONS

This application claims priority to and the benefit of a U.S. Provisional Application Ser. No. 62/002,596, filed 23 May 2014 and of a U.S. Provisional Application Ser. No. 62/004,799, filed 29 May 2014, which are both incorporated by reference herein.

BACKGROUND

As an example, artificial lift equipment such as an electric submersible pump (ESP) can include a multiphase electric motor. In such an example, submersible may refer to an arrangement of components of the ESP that allow it to operate while disposed at a position in a geologic formation such as a position within a fluid reservoir. For example, a submersible multiphase electric motor may be a sealed motor (e.g., hermetically sealed, etc.) where one or more seals (e.g., mechanical, fluidic, etc.) act to preserve integrity of the motor when disposed in an environment. As an example, a system that is at least in part submersible may include a submersible multiphase electric motor, which may be operatively drive a pump and/or other equipment.

SUMMARY

A method can include receiving sensor information from at least one sensor disposed in a downhole environment that includes an electric submersible pump operatively coupled to a power drive via a cable; receiving electrical information associated with transmission of power via the cable; and identifying a state of the electric submersible pump via an adaptive model of at least the cable and the electric submersible pump based at least in part on a portion of the sensor information and a portion of the electrical information. A system can include a processor; memory operatively coupled to the processor; and one or more modules stored in the memory that include processor executable instructions where the instructions include instructions to instruct the system to receive sensor information from at least one sensor disposed in a downhole environment that includes an electric submersible pump operatively coupled to a power drive via a cable; receive electrical information associated with transmission of power via the cable; and identify a state of the electric submersible pump via an adaptive model of at least the cable and the electric submersible pump based at least in part on a portion of the sensor information and a portion of the electrical information. One or more computer-readable storage media can include processor-executable instructions that can include instructions to instruct a computing system to: receive sensor information from at least one sensor disposed in a downhole environment that includes an electric submersible pump operatively coupled to a power drive via a cable; receive electrical information associated with transmission of power via the cable; and identify a state of the electric submersible pump via an adaptive model of at least the cable and the electric submersible pump based at least in part on a portion of the sensor information and a portion of the electrical information. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

Figure 1:
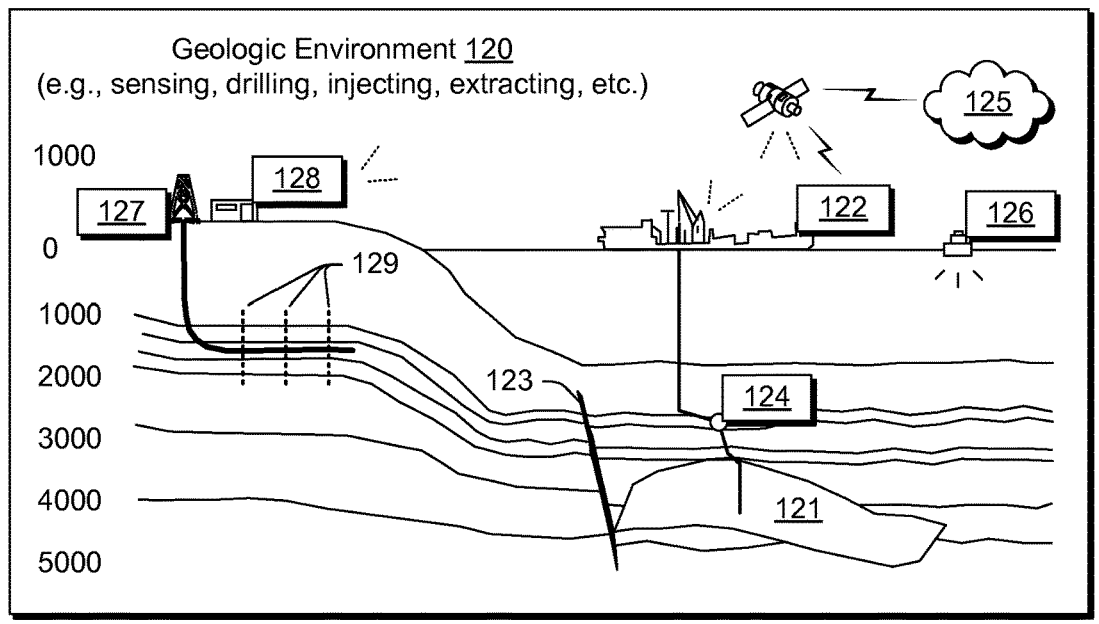
FIG. 1 illustrates examples of equipment in geologic environments.
Figure 1:
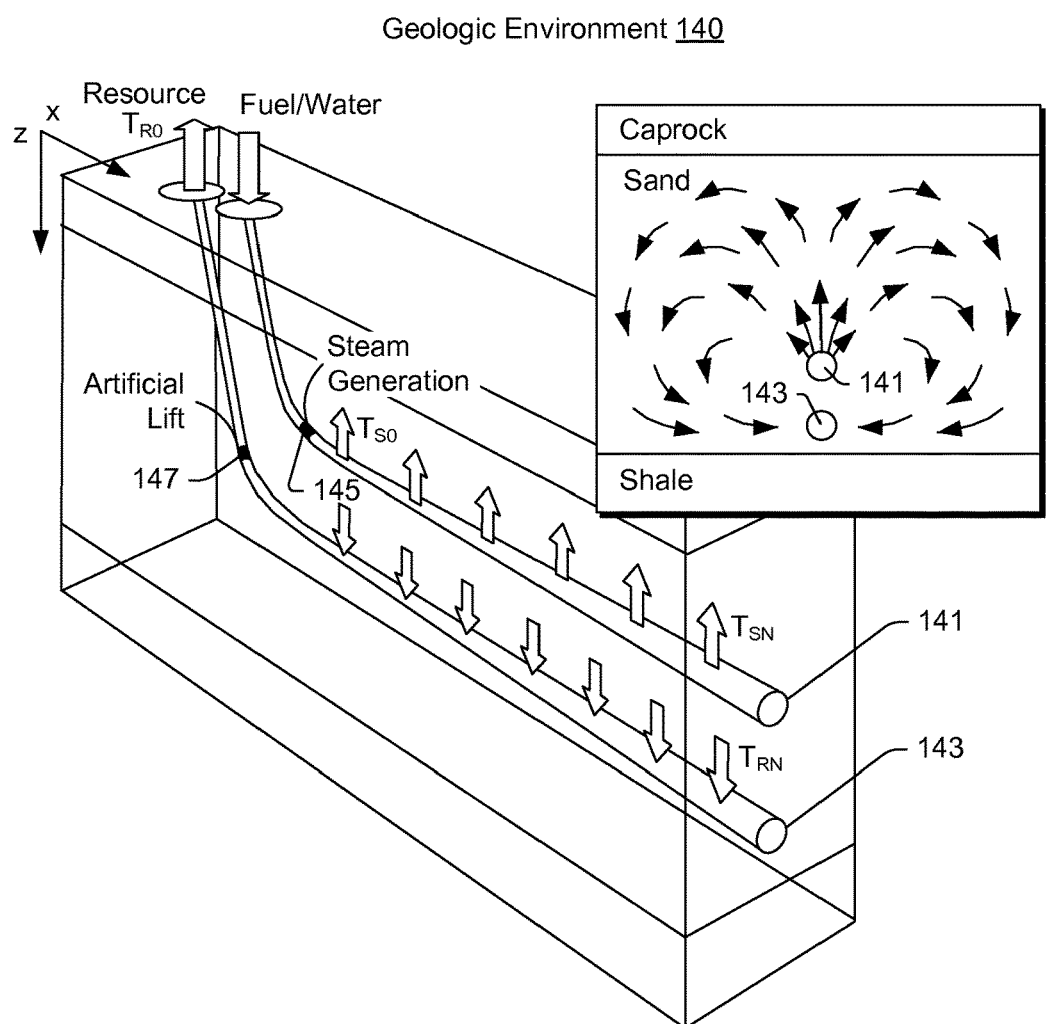

The following description includes the best mode presently contemplated for practicing the described implementations. This description is not to be taken in a limiting sense, but rather is made merely for the purpose of describing the general principles of the implementations. The scope of the described implementations should be ascertained with reference to the issued claims.

An electric submersible pump (ESP) or other downhole equipment may include one or more electric motors. A motor may be driven, for example, via a multiphase power supply and a power cable or cables that provide, for example, a 3-phase AC power signal. As an example, an ESP motor may be coupled to a 3-phase power signal via a balanced inductor network having a neutral, ungrounded node, which may be referred to as a "wye node" or "wye point" of the ESP motor. Voltage and current levels of the 3-phase AC power signal provided by a power supply to an ESP motor may be, for example, of the order of several kilovolts (e.g., or more) and tens of amperes and oscillate at a frequency of the order of about 60 Hz.

Adjustments may be made to an ESP, for example, where the ESP is outfitted with a variable-speed drive (VSD) unit. As an example, a VSD unit can include an ESP controller such as, for example, the UNICONN™ controller marketed by Schlumberger Limited (Houston, Tex.). In combination, a VSD unit with an ESP controller allows for variations in motor speed, which may better manage power, heat, etc.

As an example, an ESP may include one or more sensors (e.g., gauges) that measure any of a variety of phenomena (e.g., temperature, pressure, vibration, etc.). A commercially available sensor is the PHOENIX MULTISENSOR™ marketed by Schlumberger Limited (Houston, Tex.), which monitors intake and discharge pressures; intake, motor and discharge temperatures; and vibration and current-leakage. An ESP monitoring system may include a supervisory control and data acquisition system (SCADA). Commercially available surveillance systems include the ESPWATCHER™ and the LIFTWATCHER™ surveillance systems marketed by Schlumberger Limited (Houston, Tex.), which provide for communication of data, for example, between a production team and well/field data equipment (e.g., with or without SCADA installations). Such a system may issue instructions to, for example, start, stop or control ESP speed via an ESP controller.

As an example, a power cable may provide for delivery of power to an ESP, other downhole equipment or an ESP and other downhole equipment. Such a power cable may also provide for transmission of data to downhole equipment, from downhole equipment or to and from downhole equipment.

Where data is transmitted via a power cable from a "remote" location to a base or other "local" location, the data transmission process may be part of a remote monitoring process. For example, where a downhole electric motor is supplied with 3-phase power via a power cable, a downhole sensor may tap into a wye point of the electric motor to transmit data via the power cable. A remote monitoring process may, for example, monitor various parameters associated with downhole equipment operation, physical phenomena, etc. Such monitoring may facilitate operation of downhole equipment or other equipment (e.g., by an operator, a controller, etc.). For example, as to a downhole ESP, remote monitoring may provide for knowledge of actual values of well parameters related to surrounding reservoir or well bore fluids. A link to communicate monitored data from downhole to uphole may economically be implemented using the same power cable that delivers the electrical power to one or more motors of the ESP (e.g., noting that such a link may be used in a reverse manner to transmit data (e.g., control instructions, etc.) to downhole equipment (e.g., an ESP, a sensor, etc.)).

As to issues associated with ESP operations, a power supply may experience unbalanced phases, voltage spikes, presence of harmonics, lightning strikes, etc., which may, for example, increase temperature of an ESP motor, a power cable, etc.; a motor controller may experience issues when subjected to extreme conditions (e.g., high/low temperatures, high level of moisture, etc.); an ESP motor may experience a short circuit due to debris in its lubricating oil, water breakthrough to its lubricating oil, noise from a transformer which results in wear (e.g., insulation, etc.), which may lead to lubricating oil contamination; and a power cable may experience a issues (e.g. short circuit or other) due to electric discharge in insulation surrounding one or more conductors (e.g., more probable at higher voltages), poor manufacturing quality (e.g., of insulation, armor, etc.), water breakthrough, noise from a transformer, direct physical damage (e.g., crushing, cutting, etc.) during running or pulling operations), chemical damage (e.g., corrosion), deterioration due to high temperature, current above a design limit resulting in temperature increase, electrical stresses, etc.

To understand better how downhole equipment may fit into an overall operation, some examples of processes are described below as applied to basins and, for example, production from one or more reservoirs in a basin.

FIG. 1 shows examples of geologic environments 120 and 140. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with any of a variety of sensors, detectors, actuators, etc. For example, equipment 122 may include communication circuitry to receive and to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc. for fracturing, seismic sensing, analysis of seismic data, assessment of one or more fractures, etc.

As to the geologic environment 140, as shown in FIG. 1, it includes two wells 141 and 143 (e.g., bores), which may be, for example, disposed at least partially in a layer such as a sand layer disposed between caprock and shale. As an example, the geologic environment 140 may be outfitted with equipment 145, which may be, for example, steam assisted gravity drainage (SAGD) equipment for injecting steam for enhancing extraction of a resource from a reservoir. SAGD is a technique that involves subterranean delivery of steam to enhance flow of heavy oil, bitumen, etc. SAGD can be applied for Enhanced Oil Recovery (EOR), which is also known as tertiary recovery because it changes properties of oil in situ.

As an example, a SAGD operation in the geologic environment 140 may use the well 141 for steam-injection and the well 143 for resource production. In such an example, the equipment 145 may be a downhole steam generator and the equipment 147 may be an electric submersible pump (e.g., an ESP).

As illustrated in a cross-sectional view of FIG. 1, steam injected via the well 141 may rise in a subterranean portion of the geologic environment and transfer heat to a desirable resource such as heavy oil. In turn, as the resource is heated, its viscosity decreases, allowing it to flow more readily to the well 143 (e.g., a resource production well). In such an example, equipment 147 (e.g., an ESP) may then assist with lifting the resource in the well 143 to, for example, a surface facility (e.g., via a wellhead, etc.). As an example, where a production well includes artificial lift equipment such as an ESP, operation of such equipment may be impacted by the presence of condensed steam (e.g., water in addition to a desired resource). In such an example, an ESP may experience conditions that may depend in part on operation of other equipment (e.g., steam injection, operation of another ESP, etc.).

Conditions in a geologic environment may be transient and/or persistent. Where equipment is placed within a geologic environment, longevity of the equipment can depend on characteristics of the environment and, for example, duration of use of the equipment as well as function of the equipment. Where equipment is to endure in an environment over an extended period of time, uncertainty may arise in one or more factors that could impact integrity or expected lifetime of the equipment. As an example, where a period of time may be of the order of decades, equipment that is intended to last for such a period of time may be constructed to endure conditions imposed thereon, whether imposed by an environment or environments and/or one or more functions of the equipment itself.

Figure 2:
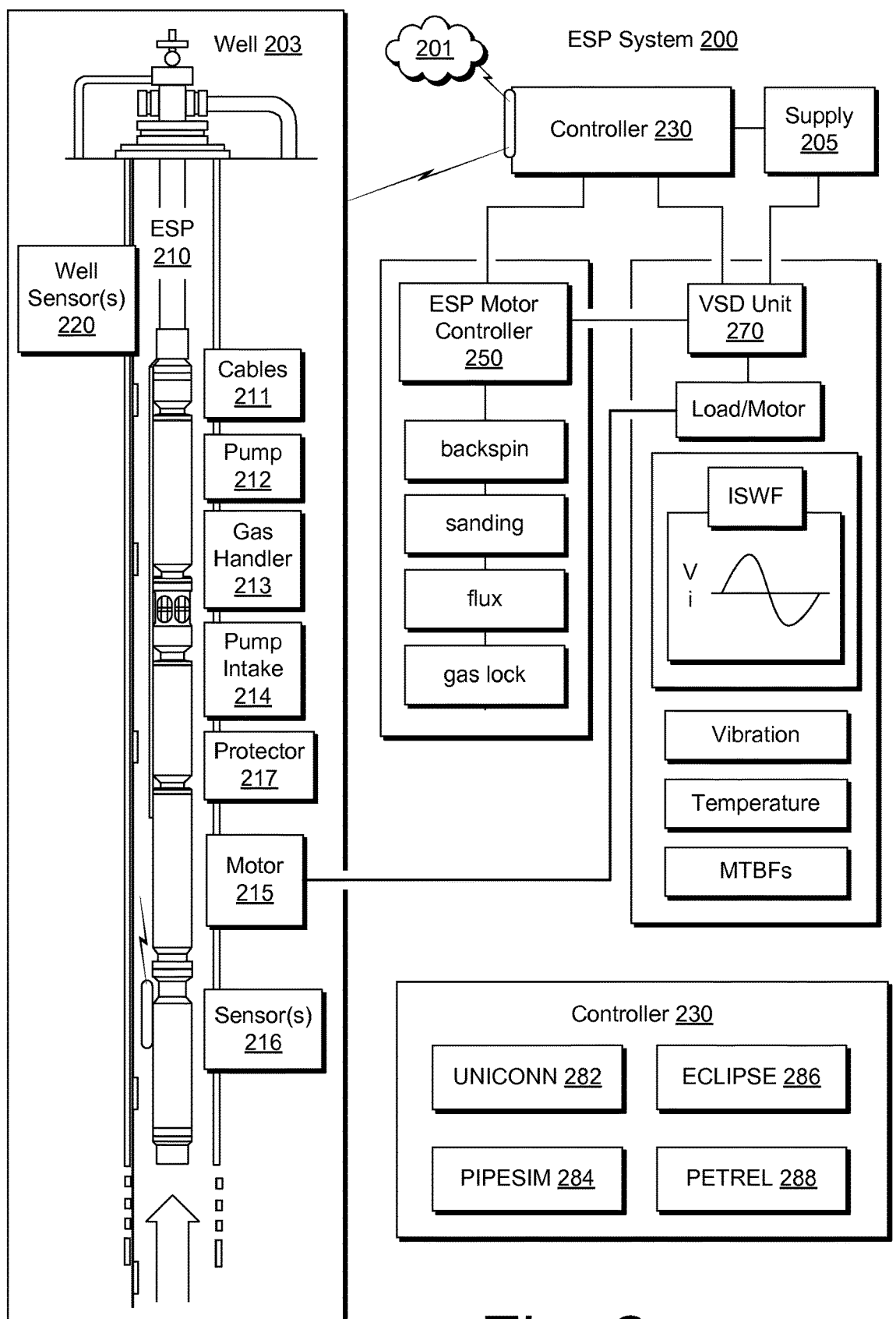
FIG. 2 illustrates an example of an electric submersible pump system.

FIG. 2 shows an example of an ESP system 200 that includes an ESP 210 as an example of equipment that may be placed in a geologic environment. As an example, an ESP may be expected to function in an environment over an extended period of time (e.g., optionally of the order of years). As an example, commercially available ESPs (such as the REDA™ ESPs marketed by Schlumberger Limited, Houston, Tex.) may find use in various applications.

In the example of FIG. 2, the ESP system 200 may be coupled to a network 201 and various components may be disposed in a well 203 in a geologic environment (e.g., with surface equipment, etc.). As shown, the ESP system can include a power supply 205, the ESP 210, a controller 230, a motor controller 250 and a variable speed drive (VSD) unit 270. The power supply 205 may receive power from a power grid, an onsite generator (e.g., natural gas driven turbine), and/or other source. The power supply 205 may supply a voltage, for example, of about 4.16 kV.

As shown, the well 203 includes a wellhead that may include equipment such as a choke (e.g., a choke valve), etc. For example, the well 203 can include a choke valve to control various operations such as to reduce pressure of a fluid from high pressure in a closed wellbore to atmospheric pressure. Adjustable choke valves can include valves constructed to resist wear due to high-velocity, solids-laden fluid flowing by restricting or sealing elements. A wellhead may include one or more sensors such as a temperature sensor, a pressure sensor, a solids sensor, etc.

As to the ESP 210, it is shown as including cables 211 (e.g., or a cable), a pump 212, gas handling features 213, a pump intake 214, a motor 215, one or more sensors 216 (e.g., temperature, pressure, strain, current leakage, vibration, etc.) and optionally a protector 217.

As an example, an ESP may include a REDA™ HOTLINE™ high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation. As an example, an ESP motor can include one or more permanent magnets.

In the example of FIG. 2, the well 203 may include one or more well sensors 220, for example, such as the commercially available OPTICLINE™ sensors or WELL-WATCHER BRITEBLUE™ sensors marketed by Schlumberger Limited (Houston, Tex.). Such sensors are fiber-optic based and can provide for real time sensing of temperature, for example, in SAGD or other operations. As an example, such information may be received by one or more of the controller 230, the ESP motor controller 250, the VSD unit 270, etc. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP, along an ESP and/or uphole of ESP. Well sensors may extend thousands of feet into a well (e.g., consider distances of about 4,000 feet or 1,220 m or more) and optionally beyond a position of an ESP.

In the example of FIG. 2, the controller 230 can include one or more interfaces, for example, for receipt, transmission or receipt and transmission of information with the motor controller 250, a VSD unit 270, the power supply 205 (e.g., a gas fueled turbine generator, a power company, etc.), the network 201, equipment in the well 203, equipment in another well, etc.

As shown in FIG. 2, the controller 230 may include or provide access to one or more modules or frameworks. Further, the controller 230 may include features of an ESP motor controller and optionally supplant the ESP motor controller 250. For example, the controller 230 may include the UNICONN™ motor controller 282 marketed by Schlumberger Limited (Houston, Tex.). In the example of FIG. 2, the controller 230 may access one or more of the PIPESIM™ framework 284, the ECLIPSE™ framework 286 marketed by Schlumberger Limited (Houston, Tex.) and the PETREL™ framework 288 marketed by Schlumberger Limited (Houston, Tex.) (e.g., and optionally the OCEAN™ framework marketed by Schlumberger Limited (Houston, Tex.)).

As an example, the one or more sensors 216 of the ESP 210 may be part of a digital downhole monitoring system. For example, consider the commercially available PHOENIX™ MULTISENSOR XT150™ system marketed by Schlumberger Limited (Houston, Tex.). A monitoring system may include a base unit that operatively couples to an ESP motor (see, e.g., the motor 215), for example, directly, via a motor-base crossover, etc. As an example, such a base unit (e.g., base gauge) may measure intake pressure, intake temperature, motor oil temperature, motor winding temperature, vibration, currently leakage, etc. As explained with respect to FIG. 4, a base unit may transmit information via a power cable that provides power to an ESP motor and may receive power via such a cable as well.

As an example, a remote unit may be provided that may be located at a pump discharge (e.g., located at an end opposite the pump intake 214). As an example, a base unit and a remote unit may, in combination, measure intake and discharge pressures across a pump (see, e.g., the pump 212), for example, for analysis of a pump curve. As an example, alarms may be set for one or more parameters (e.g., measurements, parameters based on measurements, etc.).

Where a system includes a base unit and a remote unit, such as those of the PHOENIX™ MULTISENSOR X150™ system, the units may be linked via wires. Such an arrangement provide power from the base unit to the remote unit and allows for communication between the base unit and the remote unit (e.g., at least transmission of information from the remote unit to the base unit). As an example, a remote unit is powered via a wired interface to a base unit such that one or more sensors of the remote unit can sense physical phenomena. In such an example, the remote unit can then transmit sensed information to the base unit, which, in turn, may transmit such information to a surface unit via a power cable configured to provide power to an ESP motor.

In the example of FIG. 2, the motor controller 250 may be a commercially available motor controller such as the UNICONN™ motor controller. The UNICONN™ motor controller can connect to a SCADA system, the ESP-WATCHER™ surveillance system, etc. The UNICONN™ motor controller can perform some control and data acquisition tasks for ESPs, surface pumps or other monitored wells. The UNICONN™ motor controller can interface with the PHOENIX™ monitoring system, for example, to access pressure, temperature and vibration data and various protection parameters as well as to provide direct current power to downhole sensors (e.g., the sensors 216). The UNICONN™ motor controller can interface with fixed speed drive (FSD) controllers or a VSD unit, for example, such as the VSD unit 270.

For FSD controllers, the UNICONN™ motor controller can monitor ESP system three-phase currents, three-phase surface voltage, supply voltage and frequency, ESP spinning frequency and leg ground, power factor and motor load.

For VSD units, the UNICONN™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 2, the ESP motor controller 250 includes various modules to handle, for example, backspin of an ESP, sanding of an ESP, flux of an ESP and gas lock of an ESP. The motor controller 250 may include any of a variety of features, additionally, alternatively, etc.

In the example of FIG. 2, the VSD unit 270 may be a low voltage drive (LVD) unit, a medium voltage drive (MVD) unit or other type of unit (e.g., a high voltage drive, which may provide a voltage in excess of about 4.16 kV). As an example, the VSD unit 270 may receive power with a voltage of about 4.16 kV and control a motor as a load with a voltage from about 0 V to about 4.16 kV. The VSD unit 270 may include commercially available control circuitry such as the SPEEDSTAR™ MVD control circuitry marketed by Schlumberger Limited (Houston, Tex.).

Figure 3:
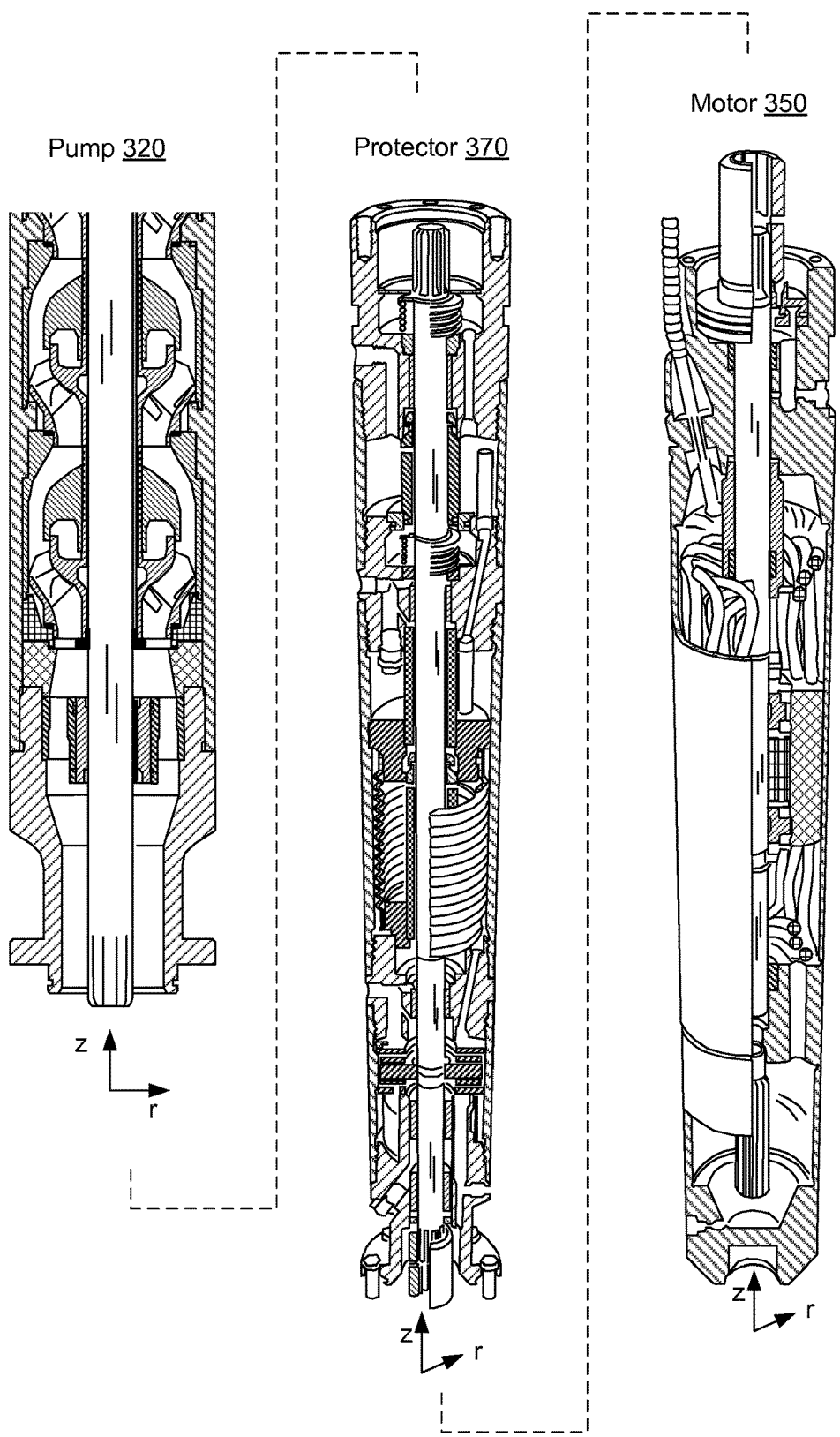
FIG. 3 illustrates examples of equipment.

FIG. 3 shows cut-away views of examples of equipment such as, for example, a portion of a pump 320, a protector 370 and a motor 350 of an ESP. The pump 320, the protector 370 and the motor 350 are shown with respect to cylindrical coordinate systems (e.g., r, z, Θ). Various features of equipment may be described, defined, etc. with respect to a cylindrical coordinate system. As an example, a lower end of the pump 320 may be coupled to an upper end of the protector 370 and a lower end of the protector 370 may be coupled to an upper end of the motor 350. As shown in FIG. 3, a shaft segment of the pump 320 may be coupled via a connector to a shaft segment of the protector 370 and the shaft segment of the protector 370 may be coupled via a connector to a shaft segment of the motor 350. As an example, an ESP may be oriented in a desired direction, which may be vertical, horizontal or other angle.

Figure 4:
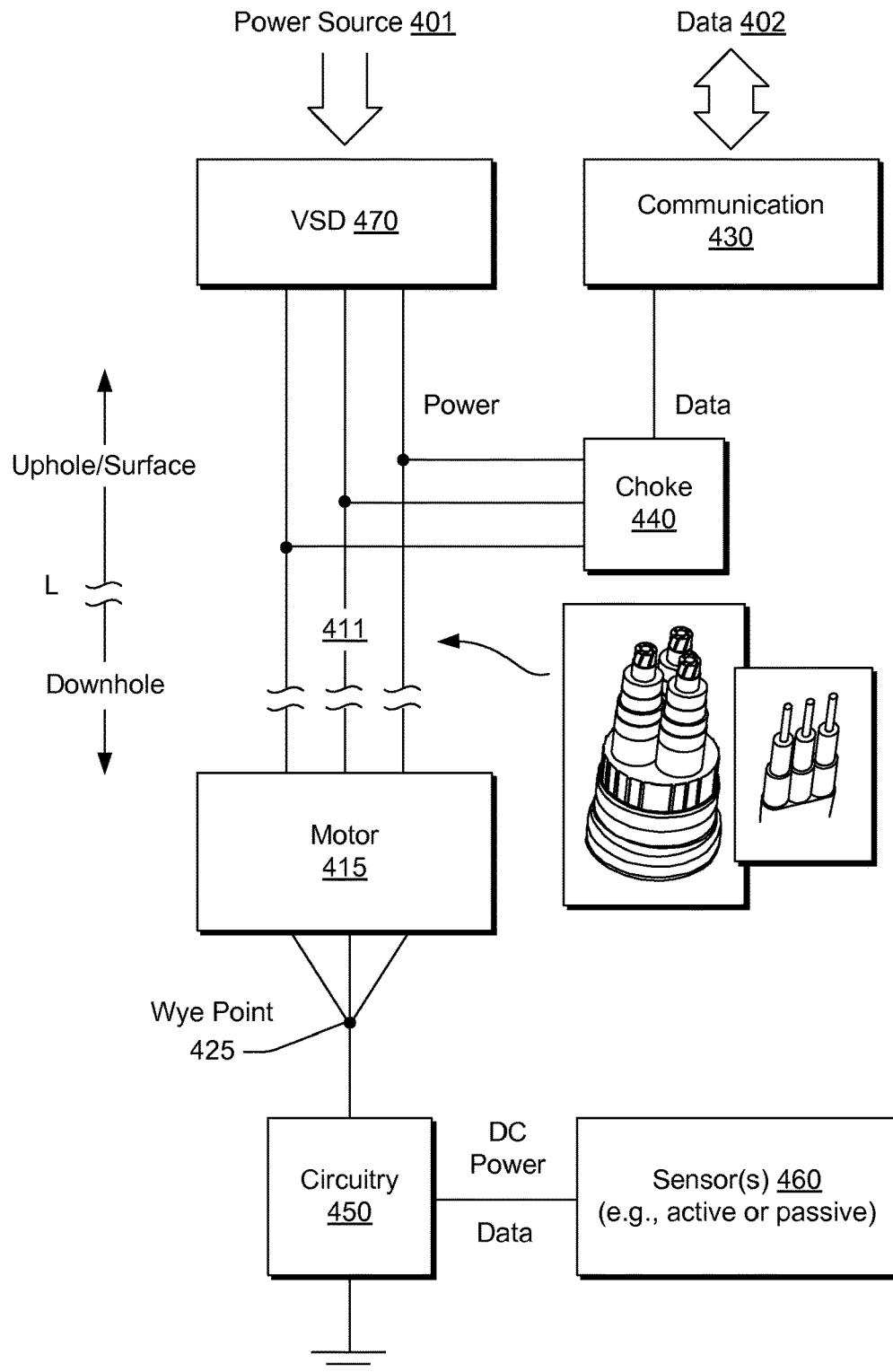
FIG. 4 illustrates examples of equipment.

FIG. 4 shows a block diagram of an example of a system 400 that includes a power source 401 as well as data 402. The power source 401 provides power to a VSD block 470 while the data 402 may be provided to a communication block 430. The data 402 may include instructions, for example, to instruct circuitry of the circuitry block 450, one or more sensors of the sensor block 460, etc. The data 402 may be or include data communicated, for example, from the circuitry block 450, the sensor block 460, etc. In the example of FIG. 4, a choke block 440 can provide for transmission of data signals via a power cable 411 (e.g., including motor lead extensions "MLEs"). A power cable may be provided in a format such as a round format or a flat format with multiple conductors. MLEs may be spliced onto a power cable to allow each of the conductors to physically connect to an appropriate corresponding connector of an electric motor.

As shown, the power cable 411 connects to a motor block 415, which may be a motor (or motors) of an ESP and be controllable via the VSD block 470. In the example of FIG. 4, the conductors of the power cable 411 electrically connect at a wye point 425. The circuitry block 450 may derive power via the wye point 425 and may optionally transmit, receive or transmit and receive data via the wye point 425. As shown, the circuitry block 450 may be grounded. While the wye point 425 is shown with three connections, which may correspond to three phases, a multiphase wye point may, as an example, include more than three phases.

As an example, power cables and MLEs that can, to at least some extent, resist damaging forces, whether mechanical, electrical or chemical, may help to ensure proper operation of a motor, circuitry, sensors, etc.; noting that a faulty power cable (or MLE) can potentially damage a motor, circuitry, sensors, etc. Further, as mentioned, an ESP may be located a kilometer or more into a wellbore. Accordingly, time and cost to replace a faulty ESP, power cable, MLE, etc., can be substantial (e.g., time to withdraw, downtime for fluid pumping, time to deploy, etc.).

Commercially available power cables include the REDAMAX™ HOTLINE™ ESP power cables (e.g., as well as motor lead extensions "MLEs"), which are marketed by Schlumberger Limited (Houston, Tex.). As an example, a REDAMAX™ HOTLINE™ ESP power cable can include combinations of one or more of polyimide tape, lead (Pb), EPDM, and PEEK, for example, to provide insulation and a jacket. As an example, lead (Pb) walls can provide for compatibility with high gas/oil ratio (GOR) and highly corrosive conditions. Armor can mechanically protect the cable and may be galvanized steel, heavy galvanized steel, stainless steel, or MONEL™ alloy. As an example, a pothead can be an electrical connector between a cable and an ESP motor that may be, for example, constructed with metal-to-metal seals. As an example, a pothead can provide a mechanical barrier to fluid entry in high-temperature applications.

As an example of a REDAMAX™ HOTLINE™ ESP power cable, a 5 kV round ELBE G5R cable can include solid conductor sizes of 1 AWG/1, 2 AWG/1 and 4 AWG/1. As another example, a 5 kV flat EHLTB G5F cable can include a solid conductor size of 4 AWG/1. As to some examples, dimensions may be, for round configurations, about 1 inch to about 2 inches (e.g., about 25 mm to about 50 mm) in diameter and, for flat configurations, about half an inch (e.g., about 12 mm) by about 1 inch to about 2 inches (e.g., about 25 mm to about 50 mm).

Figure 5:
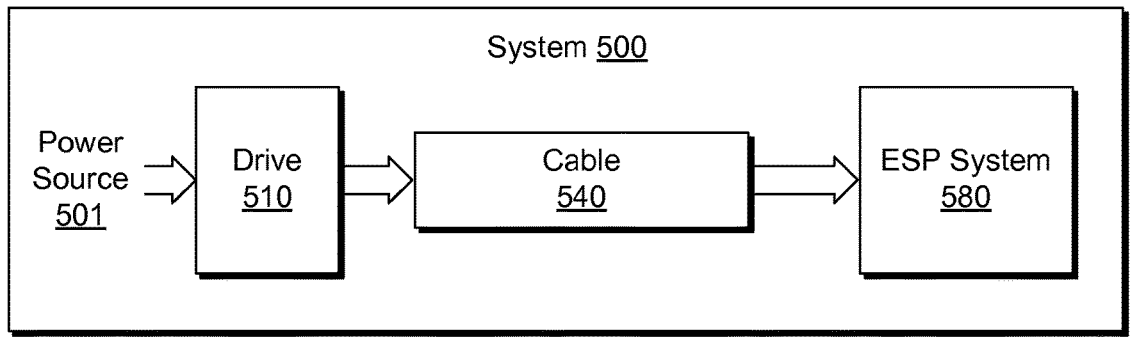
FIG. 5 illustrates an example of a system.
Figure 5:
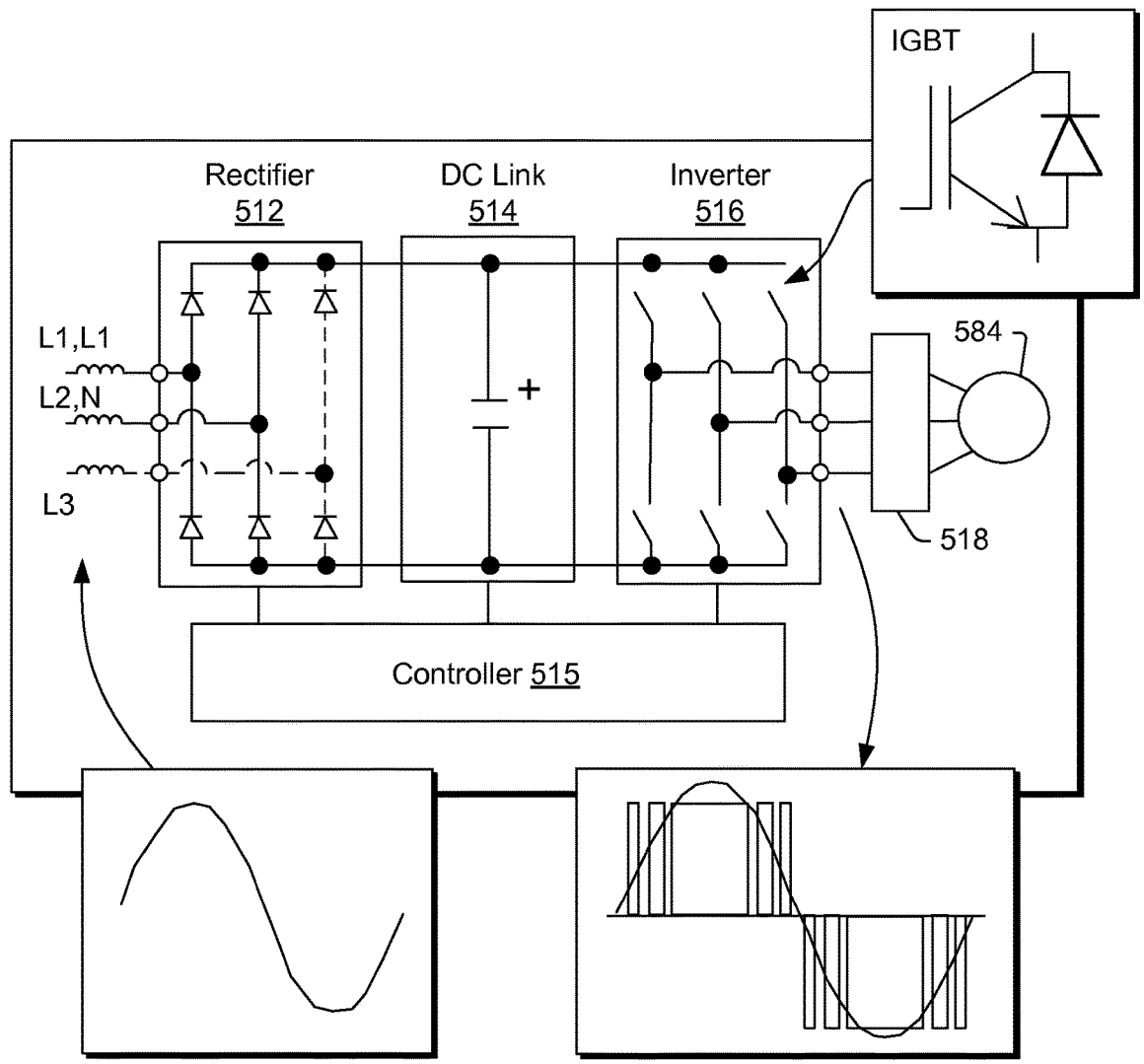

FIG. 5 shows an example of a system 500 that includes a drive 510, a cable 540 and an ESP system 580 (e.g., noting that the cable 540 may be part of an ESP system). As an example, the cable 540 may be a single cable or multiply strung cables. As an example, a cable or cables may have a length of the order of hundreds or thousands of meters (e.g., a cable for a downhole application may be about 100 meters or more in length). As to the drive 510, it may include, for example, neutral-clamped PWM circuitry, cascade circuitry, etc.

As an example, the drive 510 may include a rectifier 512, a DC link 514, a controller 515 and an inverter 516, which may include insulated-gate bipolar transistors (IGBTs). As indicated in the example of FIG. 5, an optional load filter 518 (e.g., or line filter) may be operatively coupled to output from the inverter 516, for example, to help protect equipment such as a motor 584 of the ESP system 580 (e.g., as operatively coupled via a cable or cables). As shown in the example of FIG. 5, a drive may include the rectifier 512 as a front end diode rectifier (e.g., AC power source to DC) and the inverter 516 as a back end PWM controlled IGBT inverter (e.g., DC to "AC"), where the load filter 518 connects to the output of the back end PWM controlled IGBT inverter 516 to damp harmonics that can, for example, result from switching of the IGBTs.

As power disturbances may affect run life of a system (e.g., mean time between failure "MTBF", etc.), as an example, a load filter may be applied to provide a cleaner (e.g., "smoother") harmonics-mitigated sine wave that, in turn, can lessen system stress. As an example, a load filter may include circuitry that may vary within limits when be subjected to various conditions. For example, changes in temperature may cause some variations in performance of a load filter (e.g., as to how "smooth" output may be from the load filter, etc.). As an example, a load filter may operate to some degree in a nonlinear manner, for example, when subjected to certain operational conditions. As a load filter can be disposed between a drive and an electric motor, nonlinearities of a load filter may have an effect on operation of an electric motor. Further, where nonlinearities exist, these may manifest in a manner that causes some asymmetry between phases (e.g., consider a three phase electric motor supplied by a three phase cable). Where a cable is of considerable length (e.g., over about 100 meters, over about 1 kilometer, etc.), such phase asymmetry at a supply end of a multiphase cable may become more asymmetric at a motor end of the multiphase cable. Phase asymmetry may have an effect on health of one or more pieces of equipment (e.g., an electric motor, etc.). As an example, phase asymmetry can lead to unbalance at a wye point of an electric motor. In such an example, where circuitry is powered by being operatively coupled to the wye point (e.g., a sensor, a gauge, etc.), the circuitry may experience detrimental currents, voltages, etc., which may, in turn, impact health and/or lifetime of the circuitry.

Figure 6:
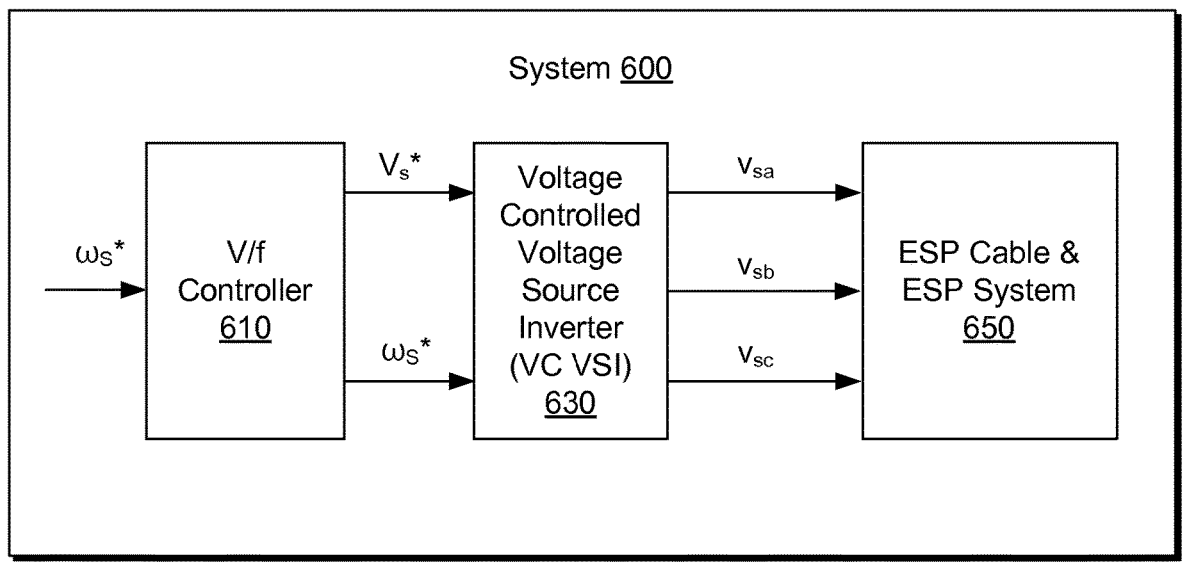
FIG. 6 illustrates an example of a system.

FIG. 6 shows an example of a system 600 that includes a controller 610, an inverter 630 and an ESP cable and ESP system 650. In such an example, the ESP system 650 may include an induction motor. As an example, the system 600 may include a load filter.

As an example, the controller 610 of the system 600 may be a variable speed drive (VSD) controller where, for example, voltage ($v_s^*$) and/or frequency ($\omega_s^*$) may be controlled (e.g., to control operation of a motor of the ESP system 650). For example, the controller 610 may be a volts-per-Hertz (V/f) controller. As shown in the example of FIG. 6, the inverter 630 of the system 600 may be a voltage controlled voltage source inverter (VC VSI). Such an inverter 630 may be operatively coupled to conductors of the ESP cable of the ESP cable and ESP system 650, for example, to supply voltages (e.g., supply voltages $v_{sa}$, $v_{sb}$, $v_{sc}$) to multiple phases (e.g., phases a, b and c) of an electric motor of the ESP system 650.

As an example, in a surface motor system, a surface induction motor may be readily accessible and, for example, physically proximate to its corresponding drive, operatively coupled by a relatively short cable (e.g., of the order of tens of meters). In such an example, readily accessible voltage sensors may be included for sensing voltage and providing feedback. Further, temperature of one or more pieces of surface equipment may be readily sensed and/or estimated, for example, via ambient temperature, efficiency rating, etc.

As explained, an electric submersible pump (ESP) may be disposed in a bore, which may be, for example, of the order of hundreds meters or a thousand meters or more in distance (e.g., depth, whether vertical, deviated, etc.). In such a scenario, a cable or cables spanning the distance between the ESP and a surface drive may likewise be of the order of hundreds of meters or a thousand meters or more in length. Further, conditions in a bore may be unknown or uncertain; noting that one or more sensors may optionally be employed in some types of applications to provide sensed information (e.g., temperature, flow rate, pressure, etc.). However, a downhole sensor may be subject to relatively harsh conditions (e.g., high temperature, high pressure, corrosive, etc.) and replacement of a failed or failing sensor may be impractical and/or uneconomical (e.g., when compared to replacement of a sensor in an above-ground system).

In various ESP applications that include an induction motor, a cable or cables may contribute considerably to resistance and inductance in phase circuit parameters of a motor drive system. A cable or cables may result in circuit parameters of a multiphase system being unbalance (e.g., asymmetrical with respect to the multiple phases).

A system that may be based on "symmetrical" phases, for example, where a cable does not contribute considerably to resistance and inductance in a manner that may cause differences between individual phase circuits of multiple phases (e.g., differences that result in asymmetry), may not adequately handle or account for asymmetry. For example, assumed conditions as to stator currents may no longer be valid due to asymmetry.

For various applications, sensing motor terminal phase to neutral voltages may not be practical or possible via standard voltage sensors and, likewise, sending such information reliably back to a surface drive for feedback operation may be problematic (e.g., fraught with noise, signal separation issues, etc.).

Figure 7:
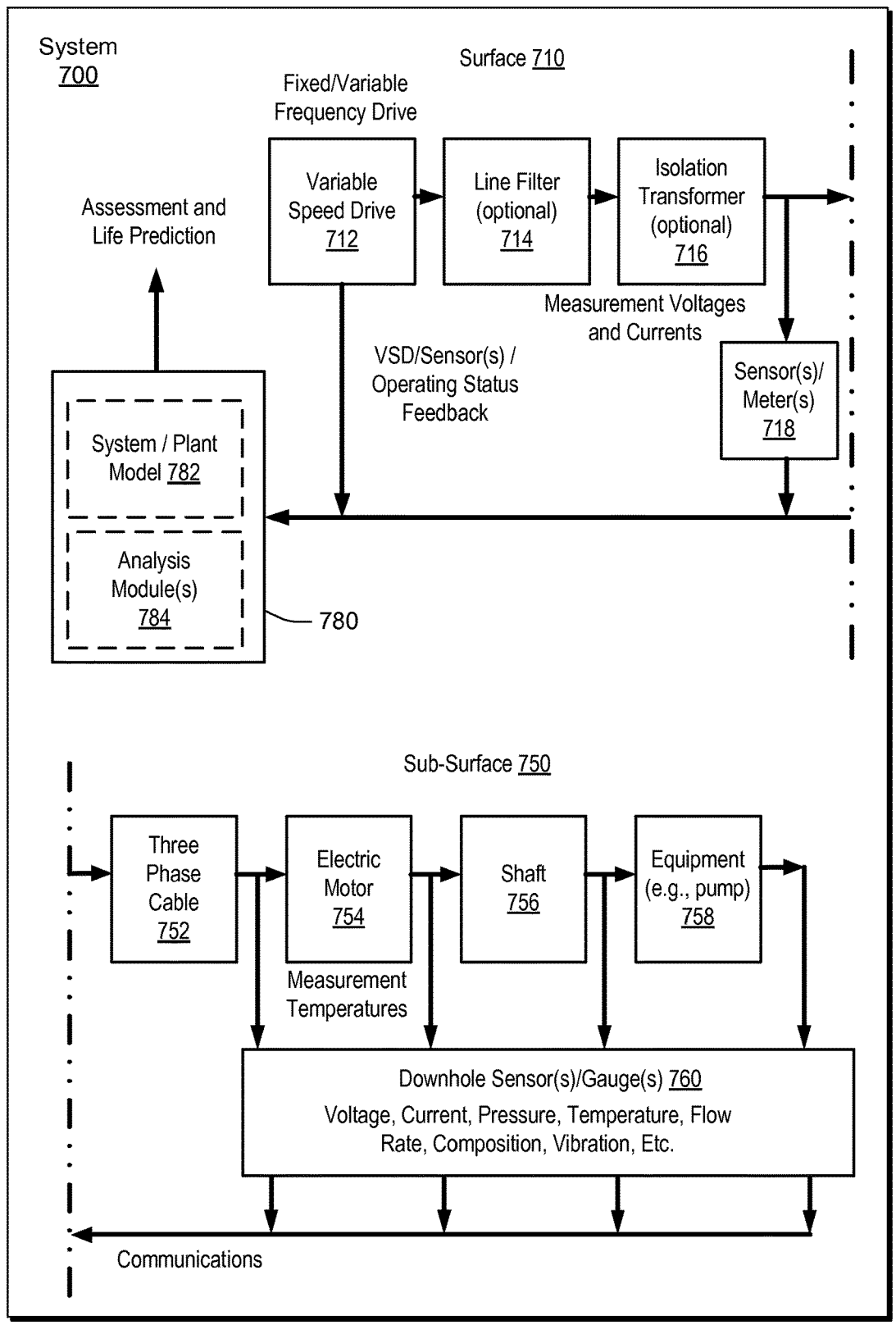
FIG. 7 illustrates an example of a system.

FIG. 7 shows an example of a system 700 that includes a surface portion 710 and a sub-surface portion 750. As an example, the surface portion 710 can include a variable speed drive (VSD) 712, optionally a line filter 714, optionally an isolation transformer 716 and one or more sensors and/or one or more meters 718. The surface portion 710 may also include a computation system 780 that can include a system and/or plant model 782 and one or more analysis modules 784. As an example, the sub-surface portion 750 can include a three phase cable 752, an electric motor 754, a shaft 756, equipment 758 (e.g., a pump, etc.) and one or more downhole sensors and/or one or more downhole gauges 760.

In the system 700, the variable speed drive 712 may be, for example, a fixed frequency drive or a variable frequency drive (e.g., voltage ($v_s^*$) and/or frequency ($\omega_s^*$) may be controlled to control an electric motor). In the system 700, the three phase cable 752 may extend to the surface portion 710 and may include a surface portion 710. In the system 700, the electric motor 754, the shaft 756 and the equipment 758 may be disposed along and/or at an end of the three phase cable 752.

As an example, the line filter 714 may be a load filter implemented in an effort to diminish risk of reflections as to high frequency PWM-driven content. For example, the line filter 714 may act to filter out frequencies above a threshold frequency. As explained with respect to FIG. 5, the load filter 518 may be applied to provide a cleaner (e.g., "smoother") harmonics-mitigated sine wave that, in turn, can lessen system stress. As an example, a line filter or a load filter may act to "clean" signals in a system, for example, at or near a supply end of a cable or cables that are operatively coupled to an electric motor that can be positioned downhole to operatively drive downhole equipment (e.g., a pump, etc.).

As an example, the three phase cable 752 may be a continuous cable that includes conductors for each of the three phases or multiple cables (e.g., individual phase cables) and/or segments spliced together. As an example, the three phase cable 752 may be constructed with integrity sufficient to bear the weight of at least the electric motor 754, the shaft 756 and the equipment 758. For example, the three phase cable 752 may be used to deploy and support at least the electric motor 754, the shaft 756 and the equipment 758 in a bore (e.g., a well, etc.).

As an example, the three phase cable 752 may experience stresses due to transmission of energy, due to temperature, due to pressure, due to tensile forces, due to compressive forces, etc. In such an example, one of more of such stresses may act in a manner that causes the three phase cable 752 to be asymmetric (e.g., to lack symmetry). Such asymmetry can affect transmission of energy such that, for example, input to the cable at a supply end via surface equipment may differ from output of the cable at a downhole end.

As an example, the electric motor 754 can be an induction motor where individual phases can be represented as a, b and c, which are joined at a wye point "N" at or near the electric motor 754.

As an example, a power cable such as, for example, the three phase cable 752, may be subject to a fault such as a ground fault (e.g., consider a ground fault state for a cable). Depending on the nature of the fault, a fault may be classified, for example, as an uphole fault or a downhole fault (e.g., an uphole fault state or a downhole fault state). Further, a fault may stem from equipment and not a power cable itself (e.g., an equipment ground fault state). As to a "ground" fault, it is a type of fault that occurs when one or more conductors are inadvertently grounded (e.g., temporarily or permanently). For a power cable, erosion of insulation about a conductor may give rise to a ground fault. For equipment to which a power cable is electrically connected, mechanical damage to the equipment may cause a conductor or a conductive component to become inadvertently grounded (e.g., temporarily or permanently).

As to some examples of issues associated with ESP operations (e.g., health and/or life expectancy related issues), a power supply may experience unbalanced phases, voltage spikes, presence of harmonics, lightning strikes, etc., which may, for example, increase temperature of an ESP motor, a power cable, etc.; a motor controller may experience issues when subjected to extreme conditions (e.g., high/low temperatures, high level of moisture, etc.); an ESP motor may experience a short circuit due to debris in its lubricating oil, water breakthrough to its lubricating oil, noise from a transformer which results in wear (e.g., insulation, etc.), which may lead to lubricating oil contamination; and a power cable may experience one or more issues (e.g. short circuit or other) due to electric discharge in insulation surrounding one or more conductors (e.g., more probable at higher voltages), poor manufacturing quality (e.g., of insulation, armor, etc.), water breakthrough, noise from a transformer, direct physical damage (e.g., crushing, cutting, etc.) during running or pulling operations), chemical damage (e.g., corrosion), deterioration due to high temperature, current above a design limit resulting in temperature increase, electrical stresses, etc. As an example, a method may output a health assessment as to one or more of the foregoing example issues, which may affect lifetime (e.g., life expectancy) of one or more components of an ESP system, etc.

As an example, where an ESP multiphase power cable develops a fault (e.g., temporarily or permanently) in the form of a current leakage path to ground on one of the power conductors, current carried by that conductor is conducted to ground through that path. In such a scenario, some current carried over the other conductors of the power cable may be conducted to ground via the current leakage path as well, for example, by flowing through the motor windings and into the conductor associated with the current leakage path. However, as impedance of the motor windings is non-zero (e.g., of the order of hundreds of ohms or more), current that flows through the motor windings to the conductor associated with the current leakage path may be limited.

As mentioned with respect to FIG. 4, circuitry may be operatively coupled to a wye point of an electric motor where such circuitry may also be operatively coupled to one or more sensors (e.g., one or more gauges). Such circuitry may derive power via the wye point and may optionally transmit, receive or transmit and receive data via the wye point. As an example, a DC power signal may be provided via a power cable and available at a wye point of an electric motor. Where sufficient balance exists between phases of AC power supplied to a multiphase power cable (e.g., an acceptable level of symmetry), a DC power signal may be sufficient for demands of one or more sensors, associated circuitry, etc. However, where unintended unbalance exceeds some reasonable level (e.g., an unacceptable level of asymmetry), a DC power signal may become "contaminated" (e.g., alternating at one or more frequencies) and may become unsuitable for powering one or more sensors, associated circuitry, etc. While a sensor, associated circuitry, etc., may include an integral voltage regulator for regulating a DC supply signal, where unintended unbalance exists, the nature of the signal reaching the integral voltage regulator may be insufficient to produce sustainable DC power. As an example, unbalance at a wye point may exist at least in part due to one or more asymmetries in a power delivery system. For example, asymmetries of a power cable may give rise to unbalance at a wye point of an electric motor. As mentioned, such asymmetries may be compounded by quality of circuitry that supplies, filters, etc., signals to a supply end of a power cable.

As an example, when a three phase power circuit for an electric motor experiences a ground or phase fault, a wye point may carry a substantial AC voltage due to unbalance. For example, assuming a 3 percent normal phase unbalance, a wye point of an electric motor may be about 45 VAC for a 1.5 kV motor and 120 VAC for a 4 kV motor. At 70 Hz a nominal 500 H choke has about 250 kohms impedance rising to about 1 mohm at 30 Hz (e.g., a choke with high frequency bypass capacitors). Assuming a 250 ohm resistive or inductive connection to ground via a unit electrically connected to the wye point of the electric motor, that unit may see a nominal voltage of about 100 VDC and almost no AC component (e.g., 0 VAC). The foregoing example demonstrates how the aforementioned choke may provide for a DC power signal via a tap to a wye point of an ESP motor where some "normal" phase unbalance exists. However, where a ground or phase fault condition exists, the wye point may rise to a large fraction (e.g., consider as much as about 70 percent or more) of the phase voltage. For example, in a worst case scenario, a wye point may carry several kilovolts RMS (e.g., at about 30 Hz) for an approximately 4 kV motor. In such an example, a unit electrically connected to the wye point of the ESP motor may see about 0 VDC, assuming the supply is effectively short circuited (e.g., and a couple of volts RMS after the choke). The actual level experienced by a unit electrically connected to a wye point of a motor may depend upon the nature of the condition or conditions. Accordingly, a ground fault (e.g., or phase fault or "phase-to-ground" fault) may impact the nature of a signal or signals carried at a wye point of a motor. Such a fault may be temporary or permanent (e.g., a temporary state, a recurrent state, a permanent state, etc.). For example, depending on cause(s), a ground fault may dissipate and later reappear or exhibit other transient behavior.

As an example, a circuit may be configured to determine that, even though a ground fault issue exists, some form of DC power signal remains and that equipment to be powered by DC power can use the remaining DC power, for example, with some amount of supplementation (e.g., via an AC to DC conversion). Where supplementation of a provided DC power signal occurs using an AC power signal (or signals), one ground fault state may be deemed a mixed DC/AC state (e.g., equipment powered via a mix of DC and DC derived from AC); whereas, for example, where the DC power signal is unsuitable, another ground fault state may be deemed an AC state (e.g., equipment powered via DC derived from AC). As an example, where a ground fault does not exist (e.g., unfaulted or non-ground fault state), a state may be deemed a DC state (e.g., for equipment powered via DC supplied from an uphole power source via a power cable).

Vibration during operation of motorized equipment may lead to wear, degraded performance, etc. As an example, excessive vibration may lead to fatigue and possibly breakage of one or more components of motorized equipment (e.g., premature failure). As an example, different types of vibration may be classified by different types of states. As an example, a state may be based at least in part on one or more types of vibrations (e.g., and optionally source, sources, etc.).

One type of vibration is shaft vibration. As an example, such vibration can occur during rotation or reciprocation of the shaft as directly or indirectly coupled to an electric motor. Shaft vibration may lead to fatigue and breakage of a shaft or, for a multi-piece shaft, one or more pieces or connectors of the shaft. Vibration may also affect condition of one or more support bearings, which may lead to excessive wear and failure of a support bearing. Various components may perform at reduced capabilities while operating under vibration. For example, a shaft seal may experience leakage (e.g., an increased level of leakage). As another example, a thrust bearing may experience an increase in temperature, a reduction in load capacity, etc. As an example, vibration may be associated with one or more gas-related issues. As an example, one or more issues may be reported as part of a health assessment and, for example, may be taken into account in predicting a life expectancy of one or more components.

As an example, motorized equipment may include one or more sensors that can measure vibration (e.g., sense vibration). For example, one or more components may be fit with a sensor that can measure vibration in real-time. As an example, vibration information may be detectable via electronics associated with supply of power to an electric motor. For example, vibration of a rotor within a stator of an electric motor may be sensed via a change in load, energy demand, etc. (e.g., consider that vibration can "waste" energy and thus be modeled as an energy sink or energy leak).

As an example, a vibration reduction mechanism may affect a vibration regime in real-time and, for example, reduce vibration magnitude, alter vibration frequency, etc. As an example, a mechanism may compensate for vibration caused by unbalance, loading, bending, etc. of a body and/or a shaft. For example, consider an equipment housing as a body where the shaft passes through at least a portion of the equipment housing. In such an example, vibrations of a housing may effect a shaft and/or vibrations of a shaft may effect a housing. Further, a housing may vibration within a bore, which may be, for example, a cased bore (e.g., a bore fit with one or more casings).

Vibration may be defined as a mechanical phenomenon whereby one or more mechanical components move, for example, as oscillations (e.g., oscillating movement). As an example, oscillations may occur about an equilibrium point. As an example, oscillations may be periodic or they may be random.

Vibration may be undesirable, desirable or neutral. For example, a type of vibration may aid with clearing debris from a fluid inlet (e.g., a screen, openings, etc.) and thus be considered desirable (e.g., a desirable vibration state). Whereas, as mentioned, other types of vibration may be undesirable and shorten lifetime of equipment, compromise performance of equipment, etc. Yet other types of vibration may be considered to be neutral, for example, of a nature that do not particularly detriment or that do not particularly benefit longevity and/or operation of equipment.

As an example, vibration can generate noise (e.g., sound). In such an example, sound, or pressure waves, may be generated by one or more vibrating structures, which may induce vibration of one or more other structures. As an example, one or more mechanisms may operate in response to pressure waves. As an example, one or more sensors may measure vibration via pressure waves.

As an example, vibration may be modeled using one or more types of models. As an example, consider a mass-spring-damper model. As an example, a system may be modeled via a plurality of individual mass-spring-damper models. As an example, a mass-spring-damper model may represent a harmonic oscillator where, for example, equations such as those for an RLC circuit may be implemented. As an example, an adaptive model may model vibration for one or more components of a system.

Figure 8:
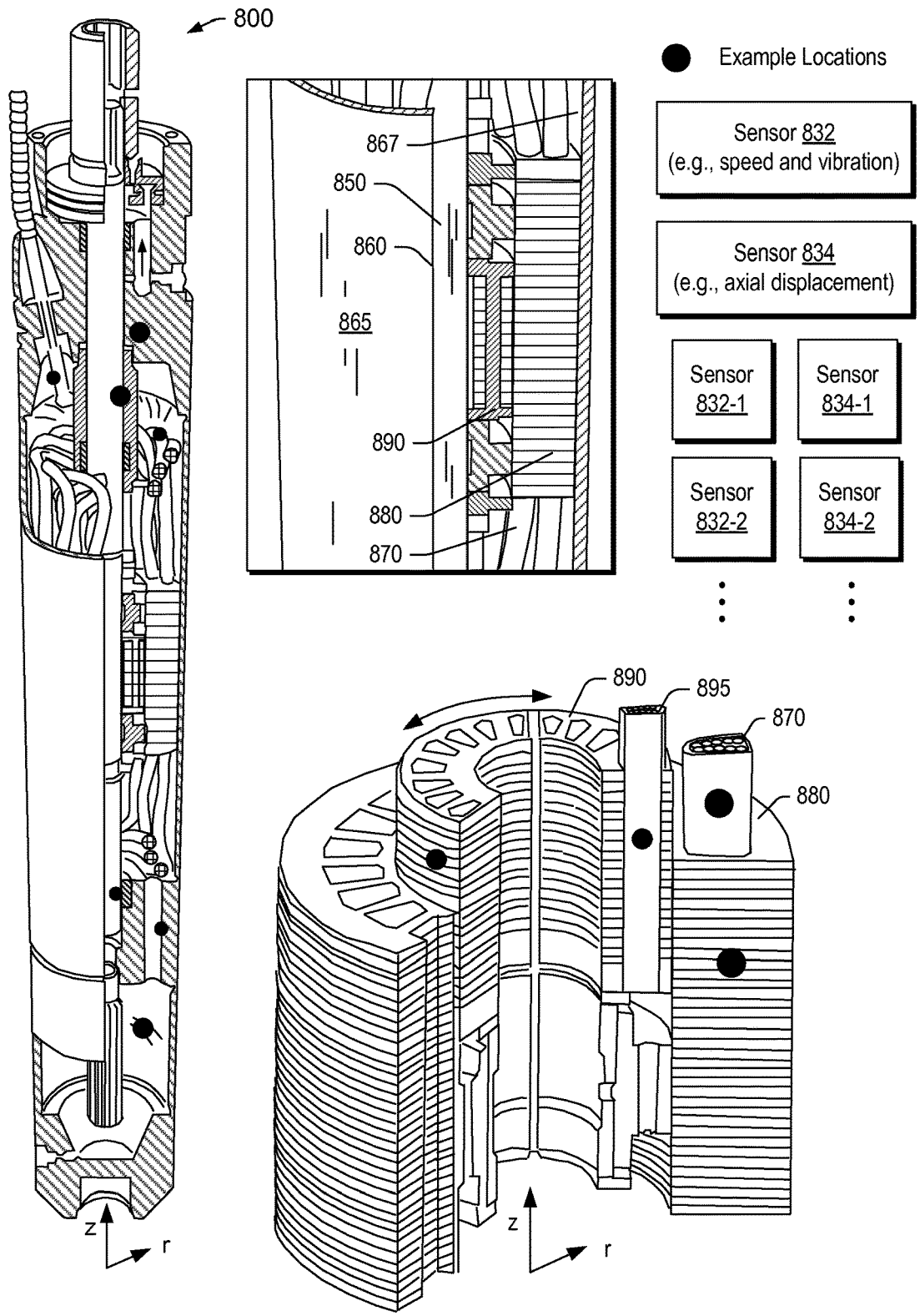
FIG. 8 illustrates an example of an electric motor and examples of sensors.
Figure 9:
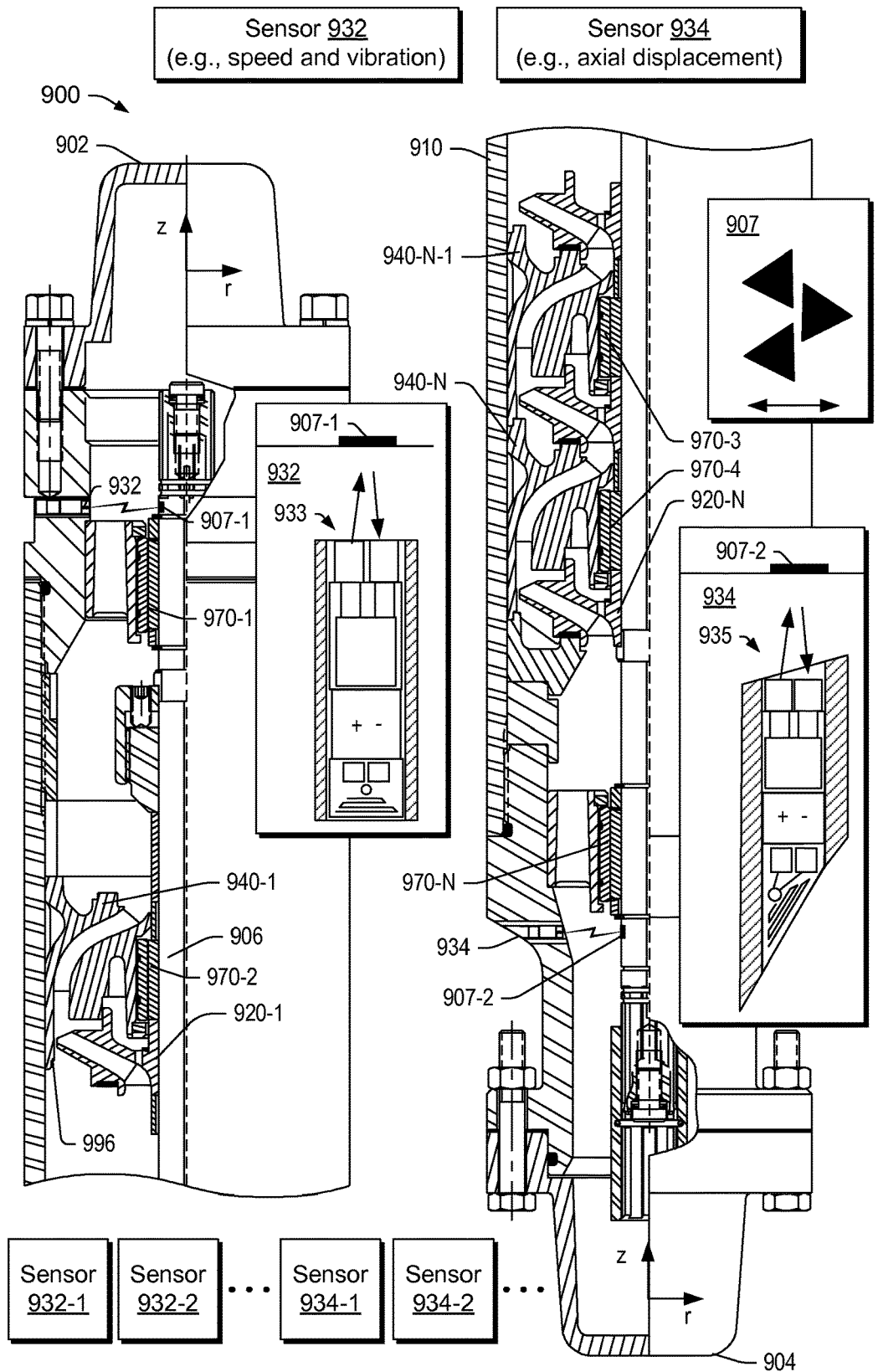
FIG. 9 illustrates an example of a pump and examples of sensors.

As to the one or more downhole sensors and/or the one or more downhole gauges 760 of the system 700 of FIG. 7, FIGS. 8 and 9 show some examples of sensors that may optionally be included in the system 700 or one or more other systems.

FIG. 8 shows an example of an electric motor assembly 800 that includes a shaft 850, a housing 860 with an outer surface 865 and an inner surface 867, stator windings 870, stator laminations 880, rotor laminations 890 and rotor windings 895. As shown, the rotor laminations 890 are operatively coupled to the shaft 850 such that rotation of the rotor laminations 890, with the rotor windings 895 therein, can rotate the shaft 850. As mentioned, a shaft may be reciprocating, for example, where a shaft includes one or more magnets (e.g., permanent magnets) that respond to current that passes through stator windings. As an example, the housing 860 may define a cavity via its inner surface 867 where the cavity may be hermetically sealed. As an example, such a cavity may be filled at least partially with dielectric oil. As an example, dielectric oil may be formulated to have a desired viscosity and/or viscoelastic properties, etc.

FIG. 8 also shows examples of sensors 832 and 834, where a system may include one or more of the sensors 832 and/or one or more of the sensors 834 (e.g., and/or optionally one or more other types of sensors). In FIG. 8, filled circles represent some example sensor locations.

As an example, a sensor may be integrated into one or more of the stator windings 870 and/or into one or more of the stator laminations 880. As an example, a sensor may be integrated into one or more of the rotor windings 895 and/or into one or more of the rotor laminations 890.

As an example, one or more sensors may be disposed within a space defined by the housing 860 of the electric motor assembly 800. As an example, a sensor may be an accelerometer (e.g., a single or multi-axis accelerometer) that can sense movement. As an example, the housing 860 of the electric motor assembly 800 may be at least partially filled with a fluid (e.g., dielectric fluid, etc.) where a sensor may sense pressure waves that pass through the fluid. In such an example, pressure waves may be sensed that are due to vibration, which may be undesirable vibration. As an example, circuitry may filter pressure waves associated with rotational operation of an electric motor from pressure waves associated with vibration of one or more components of the electric motor (e.g., a housing, a shaft, etc.). As an example, a sensor may include one or more piezo-elements that respond to stress and/or strain. As an example, a sensor may detect movement of one component with respect to another component.

As shown in FIG. 8, the sensor 832 may include circuitry for speed and/or vibration sensing and the sensor 834 may include circuitry for axial displacement sensing. As an example, sensors may include one or more of an impeller vane sensor configured for vane pass speed and/or vane wear sensing, a hydraulic seal sensor configured for leakage and/or wear sensing, a diffuser sensor configured for separation sensing, a bellows sensor configured for expansion and/or contraction sensing, a shaft seal sensor configured for separation, wear and/or skipping sensing and/or a thrust bearing sensor configured for lift sensing. As an example, one or more sensors may be part of equipment such as equipment that can be deployed in a downhole environment. As an example, one or more sensors may be a proximity sensor.

FIG. 9 shows cutaway views of a system 900 that includes at least one of a sensor 932 and/or at least one of a sensor 934. As shown the system 900 includes an end cap 902 and an end cap 904 that are fit to ends of a housing 910 that houses various components of a pump such as a shaft 906, impellers 920-1 to 920-N and diffusers 940-1 to 940-N. The end caps 902 and 904 may be employed to protect the system 900, for example, during storage, transport, etc.

In the example of FIG. 9, rotation of the shaft 906 (e.g., about a z-axis) can rotate the impellers 920-1 to 920-N to move fluid upwardly where such fluid is guided by the diffusers 940-1 to 940-N. As an example, a pump stage may be defined as an impeller and a diffuser, for example, the impeller 920-1 and the diffuser 940-1 may form a pump stage. In the example of FIG. 9, flow in each stage may be characterized as being mixed in that flow is both radially and axially directed by each of the impellers 920-1 to 920-N and each of the diffusers 940-1 to 940-N (see, e.g., the r, z coordinate system).

As an example, the sensor 932 may be mounted in an opening of the housing 910 and include an end directed toward the shaft 906. As shown, the sensor 932 includes circuitry 933 such as, for example, emitter/detector circuitry, power circuitry and communication circuitry. As an example, power circuitry may include power reception circuitry, a battery or batteries, power generation circuitry (e.g., via shaft movement, fluid movement, etc.), etc. As an example, communication circuitry may include an antenna or antennas, wires, etc. As an example, communication circuitry may be configured to communication information (e.g., receive and/or transmit) via wire (e.g., conductor or conductors) or wirelessly.

As an example, the shaft 906 may include a marker 907-1 that can reflect energy emitted by an emitter of the sensor 932 where such reflected energy may be detected by a detector of the sensor 932. For example, an emitter may be an electromagnetic energy emitter that can emit energy at one or more wavelengths (e.g., IR, VIS, UV, etc.). As an example, an emitter may be an LED, a laser or other emitter. As an example, a detector may be an electromagnetic energy detector that can detect energy at one or more wavelengths (e.g., IR, VIS, UV, etc.). As an example, the shaft 906 may be fit with a reflector strip as the marker 907-1 such that rotation of the shaft 906 may allow the sensor 932 to sense rotation of the shaft 906 by passage of the reflector strip in front of an emitter/detector of the shaft sensor 912. For example, where the shaft 906 of the system 900 (e.g., without the end caps 902 and 904) is operatively coupled to a motor, rotational speed of the shaft 906 may be sensed via the sensor 932, deviations indicative of vibrations of the shaft 906 may be sensed via the sensor 932, etc.

As an example, the circuitry 933 of the sensor 932 may include vibration sensing circuitry. For example, the circuitry 933 may include a detector array that can sense spatial deviations in reflected energy over time while the shaft 906 is rotating. Such a detector array may be a linear array or a matrix array and may interact with one or more markers 907-2 of the shaft 906. As an example, in absence of vibration, reflected energy may be detected as having a peak with respect to one or more detector elements of the array; whereas, in presence of vibration, reflected energy may be detected as having a peak or peaks that move with respect to the detector elements. In such an example, greater movement of peak reflected energy with respect to time may indicate larger amplitude vibrations. Further, a frequency analysis of detected energy with respect to time with respect to one or more detector elements may indicate one or more vibration frequencies.

As to the sensor 934, it can include circuitry 935 such as, for example, emitter/detector circuitry, power circuitry and communication circuitry. As an example, the shaft 906 may include a marker that can be tracked by the shaft sensor 934 to sense axial movement of the shaft 906 (e.g., along the z-axis). Such information may be germane to positions of one or more of the impellers 920-1 to 920-N with respect to positions of one or more of the diffusers 940-1 to 940-N.

As an example, where a shaft is supported by one or more bearings (see, e.g., bearings 970-1, 970-2, 970-3, 970-4 and 970-N), walking, shifting, etc. of the shaft with respect to the one or more bearings may be related to rotational speed, load, etc. For example, a shaft may "walk up" (e.g., ride up, ride down, etc.) with respect to a bearing in a manner dependent on shaft rotational speed. As an example, a shaft may seat in a bearing in a manner that depends on one or more operational conditions (e.g., shaft rotational speed, fluid properties, load, etc.). In such an example, a shaft may change in its radial position, axial position or radial and axial position with respect to a bearing. As an example, a shaft displacement sensor may be configured to sense one or more of axial and radial position of a shaft. In such an example, where a change in shaft speed occurs, a change in axial and/or radial position of the shaft (e.g., optionally with respect to a bearing, etc.) may be used to determine axial and/or radial displacement of the shaft.

As an example, a proximity sensor may be configured to detect presence of an object without direct contact with the object (e.g., a non-contact sensor). In such an example, an object may be a component, a marker or other object. As an example, a proximity sensor may detect a clearance (e.g., a gap) between objects or, for example, adjacent to an object. As an example, a sensor may employ a contact mechanism to determine proximity or, for example, lack thereof, with respect to an object. For example, consider a strain gauge that can measure strain with respect to two components where the strain depends on proximity of one of the components with respect to the other one of the components.

As another example, an electrical contact strip may break where proximity is lost. For example, an electrical contact strip may be mounted to two components with or without slack such that loss of proximity (e.g., gap formation, etc.) between the components causes the electrical contact strip to break (e.g., where the gap exceeds strain tolerated by the strip, slack of the strip, etc.). As an example, a series of electrical contact strips may be employed, optionally with different values of resistance (e.g., ohms). In such an example, a current that passes through the strips may change as one or more of the strips breaks (e.g., consider resistors in parallel). For example, a circuit may be formed using electrical contact strips of different lengths and resistances (e.g., resistance per unit length, etc.) where the circuit is coupled to or across two components. In such an example, as the two components move away from each other individual strips may break successively to alter resistance in the circuit where one or more measurements using the circuit may infer or determine how large of a gap exists between the two components.

Figure 10:
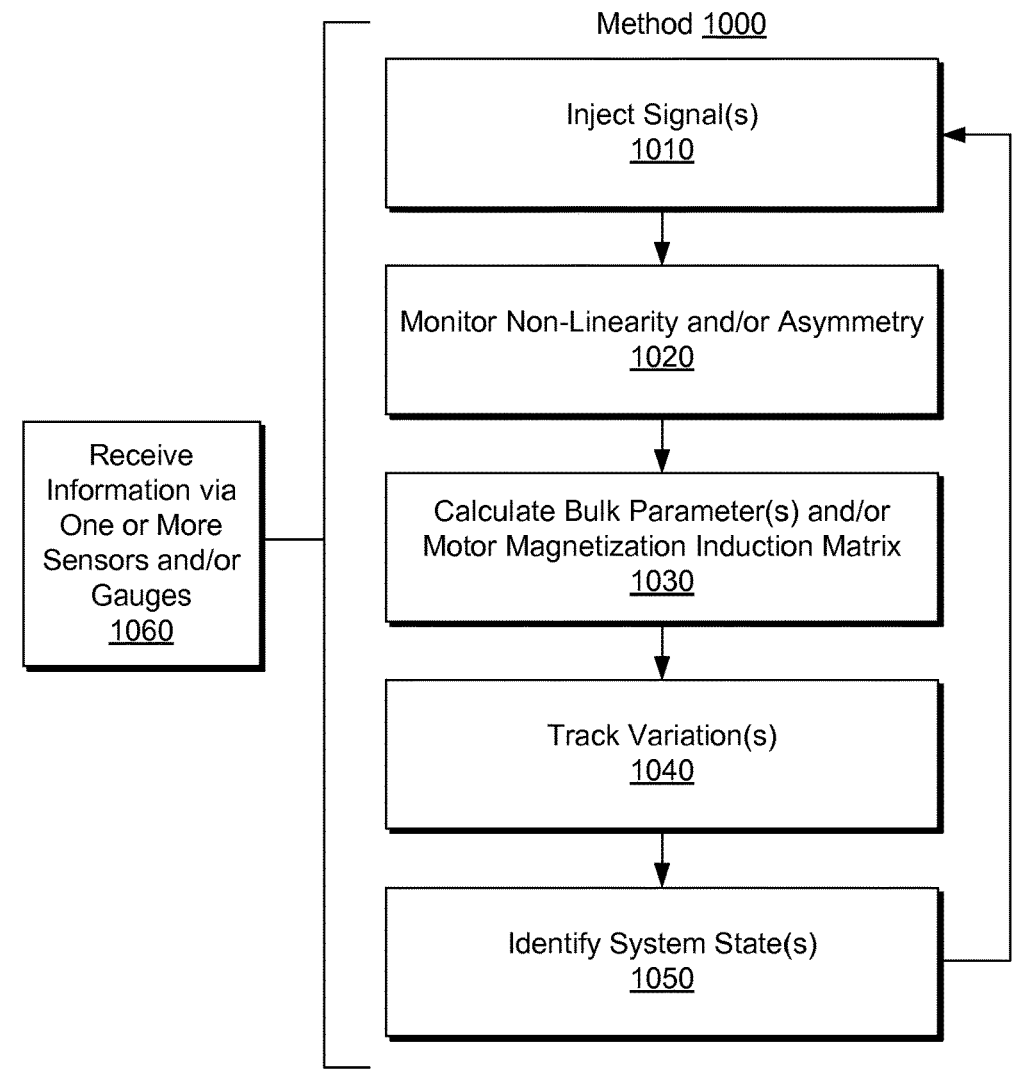
FIG. 10 illustrates an example of a method and an example of a scenario.
Figure 10:
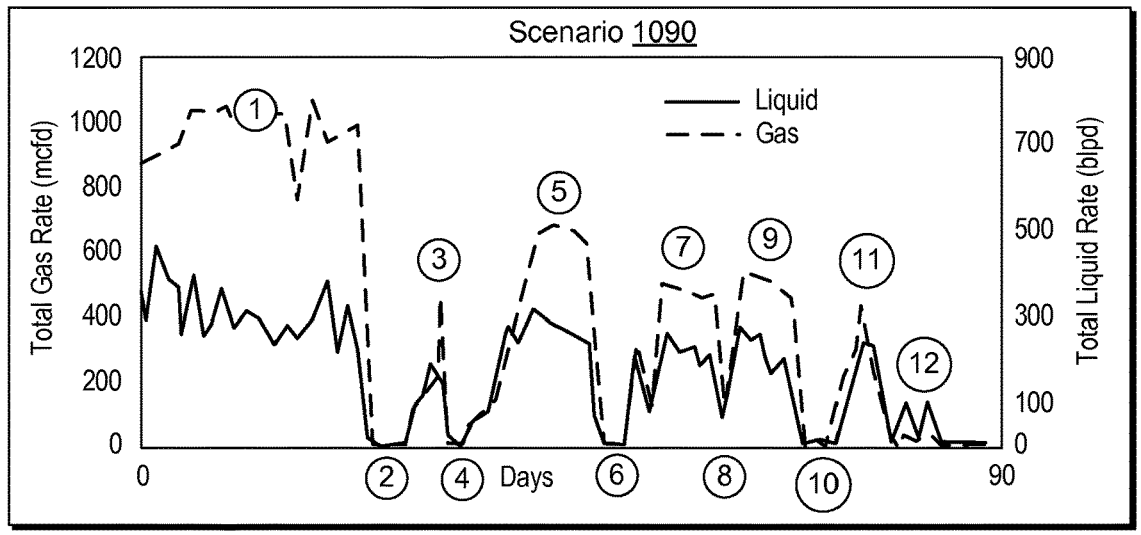

FIG. 10 shows an example of a method 1000 for identifying one or more system states of a system such as, for example, the system 700 of FIG. 7. FIG. 10 also shows an example of a scenario 1090 spanning a period of days where gas flow rates and liquid flow rates vary and may be identified as one or more states (see, e.g., states 1 to 12). As an example, a state may be defined by a gas-liquid ratio (GLR), a gas volume fraction (GVF), etc. As an example, a state may be defined as a shut-down state, a start-up state, etc. As an example, a state, a state transition, etc., of one or more pieces of equipment may affect a state, a state transition, etc., of a cable (e.g., as to asymmetry of a cable, etc.). As an example, states and/or state transitions may be considered when determining health of one or more components of a system, predicting life expectancy of one or more components of a system, etc.

As shown in FIG. 10, the method 1000 includes an injection block 1010 for injecting one or more signals to a power cable of a system, a monitor block 1020 for monitoring non-linearity and/or asymmetry in the system, a calculate block 1030 for calculating one or more bulk parameter values and/or values of a motor magnetization induction matrix (e.g., or vector or vectors), a track block 1040 for tracking one or more variations and an identification block 1050 for identifying one or more system states. As shown in the example of FIG. 10, the method 1000 can include a reception block 1060 for receiving information via one or more sensors and/or gauges, which can include one or more downhole sensors and/or gauges.

In the example of FIG. 10, the method 1000 may be model-based. For example, consider the system and/or plant model 782 of the system 700 of FIG. 7. In the example of FIG. 10, the method 1000 may include implementing one or more analysis modules, for example, consider the one or more analysis modules 784 of the system 700.

As an example, a system state may relate to a health assessment and/or a life expectancy prediction of one or more components of a system such as, for example, an electrical submersible pump (ESP) system. As an example, a system state may relate to one or more power cables, one or more electric motors, one or more shafts, one or more mechanical pumps, etc. In such an example, an electric motor (e.g., or electric motors) of an ESP system may be driven by a fixed or variable frequency multiphase power supply, for example, consider a three-phase AC power signal, via a power cable or cables.

As an example, a method such as, for example, the method 1000 of FIG. 10, may assess the health of one or more components of an ESP system using an adaptive model-based approach where health of an electric motor and a pump may be tracked following changes in system state and/or load conditions with respect to time. As an example, loading on an ESP system may change more dramatically than loading on a pump system (e.g., a surface system) used in a process plant. For example, consider a change in loading on an ESP system due to gas-liquid slugging, where fluid density can change by an order of magnitude for periods lasting seconds, minutes or even hours. Such changes can present particular challenges in determining the current state of the ESP system. As explained with respect to the system 700, an approach to assessment may include integration of sensed and/or metered information at surface and/or subsurface portions.

As an example, in an initial phase of an ESP system identification, a method can include monitoring non-linear and/or un-symmetric conditions of one or more components such as, for example, a line filter (e.g., a load filter, etc.), a transformer, a power cable, a stator of an electric motor, etc. In such an example, one or more values as to, for example, an electric motor bulk impedance model may be generated. In such an example, consider calculation of values such as, for example, one or more of a bulk leakage inductance, a bulk serial stator resistance and a motor magnetization inductance matrix (e.g., or vector or vectors). In such an example, variation of combined resistance, inductance, and capacitances, for example, can be tracked during operation. For example, for purposes of tracking, consider injecting a low frequency tone that is superimposed to a regular operational power signal. As an example, system identification may be updated via tracking one or more factors that can affect the state of the system. As an example, such one or more factors may include one or more factors that relate to one or more of vibration, pressure, temperature, fluid flow rate, and fluid multi-phase composition.

As indicated in the method 1000 of FIG. 10, one or more loops may exist, for example, that can act to update to a system model of a system. Such an approach can combine electrical measurements of multi-phase voltages and/or currents input to an electric motor of an ESP system to help provide a comprehensive health assessment of the ESP system.

As an example, the method 1000 may help to reduce errors in health monitoring and useful remaining life predictions that may be contributed by one or more of non-idealities of a line filter (e.g., a load filter, etc.), an isolation transformer, one or more unsymmetrical cables, one or more types of asymmetry in one or more electrical motors, etc. As an example, a system model may be updated on a substantially continuous basis via, at least in part, monitoring as to one or more ESP system parameters such as, for example, one or more parameters for temperature, fluid flow, and fluid composition. In such an example, information may be provided via one or more surface sensors/meters and/or sub-surface sensors/meters.

As an example, a system can include one or more components that may be subject to one or more mechanical, electrical, or electromechanical faults. As an example, a system can include an electric motor, motor-driven equipment, an electric generator, an electric battery, etc. As an example, a system can include a single phase or polyphase alternating current induction motor, an alternating current synchronous motor, a direct current motor, a universal alternating current/direct current motor, a permanent magnet motor, or a switched reluctance motor. As an example, an electric motor can be a multiphase alternating current induction motor.

As an example, a component of a system may have a fault such as a mechanical, electrical, or electromechanical fault. As an example, an electrical fault may be a type of fault that results in altering flow of current to or through a component. As an example, a mechanical fault may be a type of fault that results in altering structural and/or mechanical aspects of a component.

As an example, information that may be used in performing an assessment of one or more components of a system may include measured input into the system and measured output from the system. As an example, consider information as to one or more of electric voltage, electric current, rotational speed, rotational acceleration, lateral acceleration, temperature, etc. As an example, for a multiphase alternating current induction motor, information may include measured input representing multi-phase voltages and measured output representing multi-phase currents.

As an example, a system may optionally include a classification module that can, for example, classify information and/or analyzed information as to one or more types of issues or potential issues of the system.

As an example, a system can include an assessment module that can, for example, assess information and/or analyzed information as to one or more types of issues or potential issues of the system. As an example, an assessment may pertain to condition of a component, which may be a present condition or a possible future condition. As an example, an assessment may include an estimate about a current status of a component, a possible impending failure of a component and/or one or more uncertainties associated with the estimate. As an example, an assessment may include a recommendation or recommendations for action, for example, consider an action as to one or more of an operating condition, a repair plan, a replacement plan, etc. As an example, an assessment may include information about operational efficiency of one or more components of a system and, for example, cost(s) associated with operational efficiency (e.g., optionally extending forward in time for one or more sets of operational conditions).

As an example, a system can include a life expectancy prediction module that, for example, can predict an expected useful life, or life expectancy, of one or more components of a system. As an example, a life expectancy may reflect an estimate as to an expected time to failure and, for example, an uncertainty associated with the estimate and/or a predicted status of an incipient failure. As an example, a life expectancy prediction module may provide for analyzing operating history of one or more components of a system. As an example, historic information may include one or more indicators of an expected lifetime (e.g., consider one or more of electrical power quality, motor ambient temperature, motor load torque pulsation, etc.).

As an example, a system may account for length of a power cable, type of power cable, historic information about a power cable (e.g., including information as to one or more other installations of such a power cable), etc.

As an example, a system can include artificial lift equipment. Such equipment may include a downhole pump coupled via a shaft to a downhole electric motor. In such an example, the electric motor can be powered from surface equipment through a relatively long power cable. For example, consider power cable that is operatively coupled to a surface mounted pulse-width modulated (PWM) drive that can control, for example, rotational speed of a rotor of an electric motor. In such an example, in an effort to avoid reflections, high PWM frequency content may be filtered out by circuitry such as a line filter (e.g., a load filter, etc.). As an example, a drive may be also isolated via a transformer. As an example, a power cable can be unsymmetrical with respect to conductors to conduct multiple phases of supplied power and one or more other components may be unsymmetrical with respect to handling of multiple phases of supplied power. For example, cable temperature, electric motor stator and rotor temperature distribution may lack symmetry. In such an example, heat transfer may be related to one or more factors such as, for example, formation fluid temperature, pump rate, heat transfer properties of the electric motor and cable(s) and the heat transfer properties of the pumped fluid or gas.

As an example, a system may aim to account for factors associated with a deep well installation. For example, consider an ESP system employed in a deep well installation where the ESP system includes a line filter (e.g., a load filter, etc.), a step-up transformer, a long cable between a variable frequency drive and a motor-pump assembly, where, for example, the length of the cable or cables may be of the order of a kilometer or more. In such an example, the length of the cable or cables can introduce asymmetries as to power such that power input to the cable at an input end differs from power output by the cable at an output end (e.g., operatively coupled to an electric motor, optionally via MLEs, etc.).

In the aforementioned system, the long cable, coupled with harmonics generated by PWM circuitry of the drive can result in voltage and current distortions that can effect health assessment and life expectancy prediction of one or more components of the ESP system.

As an example, a system can include interpreting electrical measurements made at or near an electric motor of an ESP system and monitoring the state of a pump as related to the transient nature of reservoir production. As an example, a system may include one or more inputs for surface measurements, such as, for example, mass flowrate, etc., which may be ascertained at or near a well head. As an example, a system may aim to capture the current state of a pump via one or more other types of information. For example, surface measurements may be affected by finite wave speeds and attenuation of pressure waves in fluids between a pump from a surface monitoring facilities. To provide additional information, a system can include inputs to receive downhole measurements, optionally at least in part via downhole signal processing, data compression and telemetry equipment so that the surface and downhole measurements can be appropriately combined, which may account for latency between surface information and downhole information.

As an example, a system may output information of interest for predictive health monitoring (e.g. degradation in performance of one or more pump stages, failure of one or more bearings, etc.) based at least in part on electrical measurements of an electric motor, surface measurement of flowrates and sub-surface measurements as to one or more parameters associated with a cable, an electric motor, a pump, etc. For example, information as to a mechanical vibrational spectrum of a downhole pump and its interaction with loading of an electrical motor may be received by a system. Such information may depend upon how a pump is mounted and, for example, one or more resonant modes of one or more sets of bearings in an electric motor, a protector and/or a pump. As an example, a system can include inputs to receive multiple types of measurements, which may optionally be measurements distributed along an electric motor, a protector and/or one or more pump stages. In such an example, at least a portion of the measurements may be used to refine a model of a system and determine or estimate its state for predictive health monitoring.

As an example, a cable may lack symmetry (e.g., a cable may be considered to be asymmetrical). For example, once deployed in a downhole environment, cable temperature, motor stator and rotor temperature distribution may not be known (e.g., at a level of desirable precision, etc.) and may vary spatially with respect to various components of a cable. In such an example, spatial variations can cause asymmetries in properties of conductors within a cable, which may, in turn, effect transmission of energy to a multiphase electric motor. As spatial variations increase, asymmetry can likewise increase, which may cause a relatively balanced supply to a supply end of a cable to become unbalanced at an electric motor end of the cable. As an example, temperatures along and within a cable can be based on one or more heat transfer mechanisms, which may be related to one or more of formation fluid temperature, pump rate, heat transfer properties of motor and cables and heat transfer properties of pumped fluid (e.g., which may be single or multiphase). As dielectric properties of a cable may depend on temperature, spatial differences in temperature may affect one or more conductors of a cable, one or more insulators of a cable, etc., in a manner that can cause unbalance (e.g., asymmetry).

As an example, an "ideal" model of a power distribution system may assume that a "balance" of multiphase input to individual phases of a multiphase cable is retained over the length of the multiphase cable, however, as explained above, where a multiphase cable is exposed to conditions that may vary over its length, such an assumption may lead to erroneous estimations as to output of the individual phases of the multiphase cable, particularly where a multiphase cable is of a considerable length (e.g., as may be associated with an ESP deployed in a well of a geologic environment). Thus, a model that is based on a symmetrical supply of power may be unsuitable for estimation of one or more conditions associated with an ESP system, especially as cable length of such a system is increased.

As an example, a model-based approach may provide for one or more equipment health related estimations, which may account for various "non-idealities" of an ESP system (e.g., factors that may be neglected by other approaches). As an example, a model-based approach may include a model that models features such as a motor driver, an isolation transformer, a line filter (e.g., a load filter, etc.), etc. As an example, in an initial phase of system identification, a combined non-linear and un-symmetric stator, line filter (e.g., a load filter, etc.), transformer, cable and motor bulk impedance model may be generated that includes a bulk leakage inductance, bulk serial stator resistance and motor magnetization inductance matrix. As an example, variation of combined resistance may be tracked during operation, for example, by injecting a low frequency tone superimposed to the regular operation. A stator modeling approach may be taken for permanent magnet synchronous motors (PMS) and induction motors (IM).

As an example, a method can include estimating equipment health and/or predicting life expectancy of one or more components of an ESP system utilizing a base model of the ESP system and downhole measurements, such as, for example, one or more of motor phase currents voltages, pressures, temperatures, vibrations, flowrate, and fluid composition.

As an example, a method can include determining remaining useful life of one or more components of an ESP system, for example, by correlating multiple input signals from sensors at surface and downhole sensors, mounted on and/or about one or more components of an ESP system, to a health-model of motor and/or pump components such as, for example, bearings, seals, electrical isolation weaknesses, etc.

Referring to the scenario 1090 of FIG. 10, disruptive conditions are encountered due at least in part to the presence of gas. As an example, for the scenario 1090, a state may be characterized at least in part by a gas-liquid ratio (GLR), gas volume fraction (GVF), etc. Where GLR (e.g., or GVF) is high (e.g., above about 10 percent, above about 20 percent, or other ESP rating, which may depend on gas-handling equipment, etc.), gas entering a pump of an ESP is a lighter phase that can "slip apart" from a heavier fluid phase and thus accumulate on the low-pressure side of a blade. In such an example, the gas may block a passage of a pump stage causing a condition known as gas lock. In gas lock (e.g., a gas lock state), flow of liquid can stop, which may, in turn, cause an increase in motor winding temperature and a decrease in load on the motor. The increase in motor winding temperature can, for example, be detrimental to the motor and shorten motor life. As an example, a sensor may be included in a system for monitoring one or more motor temperatures (e.g., motor winding temperature, etc.).

Load on an ESP can vary in response to GLR, GVF, etc. As an example, a controller may act to change the speed of an ESP motor (e.g., via a VSD) to ride through a gas slugging episode. In the method 1000 of FIG. 10, such control may be based at least in part on one or more identified system states (e.g., per the block 1050).

With respect to assessment of system health, identified system states (e.g., per the block 1050) and/or control actions may be taken into account. For example, where an identified system state is associated with shut down of an ESP (e.g., a controlled shut down), an expected next system state may be a start-up state (e.g., a controlled start-up). Shut down and start-up of an ESP can impact health of one or more components and, for example, possible shorten lifetime of an ESP deployed in a downhole environment. As an example, a method can include assessing health of one or more components and/or predicting lifetime of one or more components based at least in part on shut down and/or start-up of an ESP.

As an example, a method such as, for example, the method 1000 of FIG. 10, may account for behavior of a multiphase cable in states, transitions between states, etc. As operation of an ESP depends on power transmitted via a power cable (e.g., or cables), an approach to health assessment (e.g., and optionally control) can include a model (e.g., an adaptive model) of at least one power cable where such a model can account for un-symmetries (e.g., or asymmetries) and/or non-linearities introduced thereby (e.g., due to length, environmental conditions, operational conditions, etc.). As an example, stresses (e.g., physical, electrical, etc.) experienced by a cable (e.g., as measured and/or estimated via a model) may be accounted for in assessing health and/or predicting lifetime of a cable and/or one or more other components of an ESP. As an example, physical stresses may result from contact with surfaces, bends, vibrations, support of an electric motor and pump in a well, etc. As an example, electrical stresses may result from transmission of power, asymmetries in power transmission, one or more paths to ground, etc.

As an example, in the method 1000 of FIG. 10, the block 1060 can include, for example, one or more sensors and/or gauges as illustrated in FIGS. 2, 8 and 9, one or more sensors of the ESPWATCHER™ and/or the LIFTWATCHER™ surveillance systems, etc. Such information may be analyzed in conjunction with information derived from power signals (e.g., VSD operational behavior) and/or one or more injected signals, for example, to assess health and/or to predict lifetime of one or more components operatively coupled to an electric motor that receives power via a multiphase power cable (e.g., consider a cable with a length of at least about 100 meters or more that is suitable for operation in a downhole environment).

Figure 11:
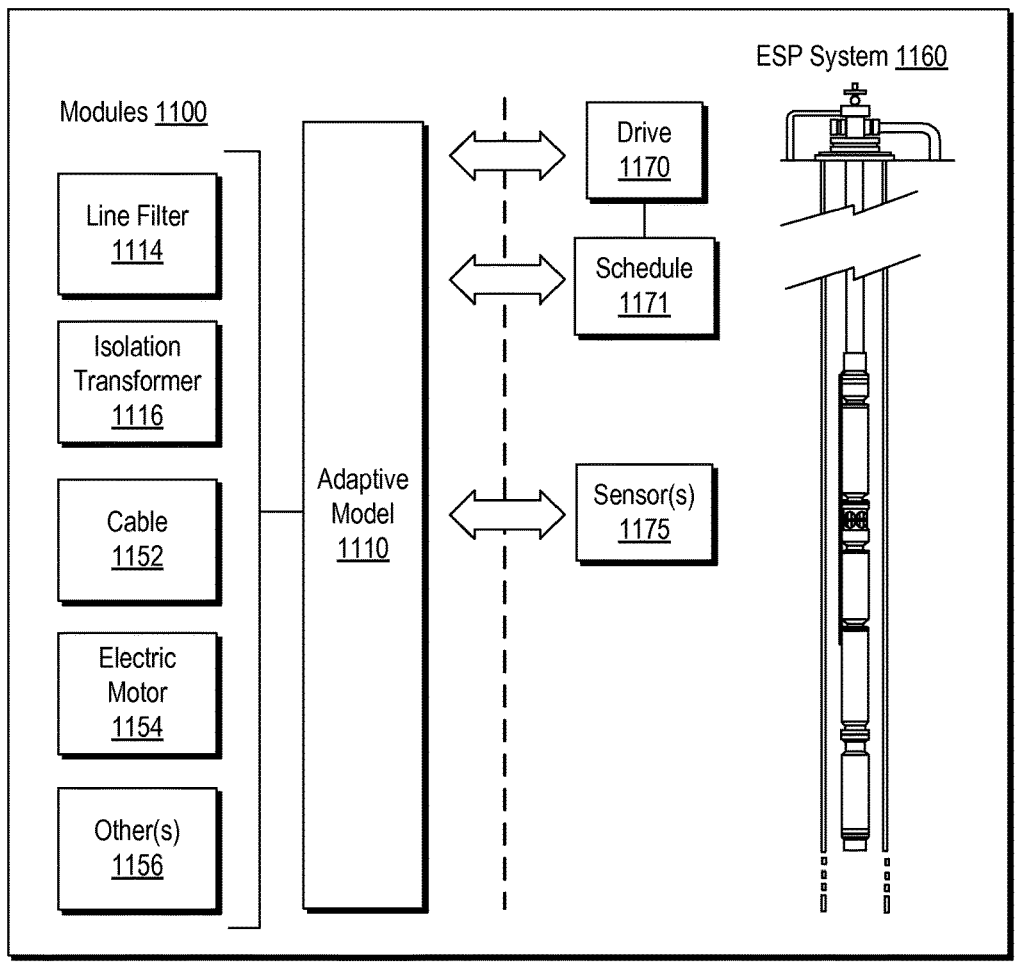
FIG. 11 illustrates examples of modules, an example of an ESP system, an example of a method and an example of a system.
Figure 11:
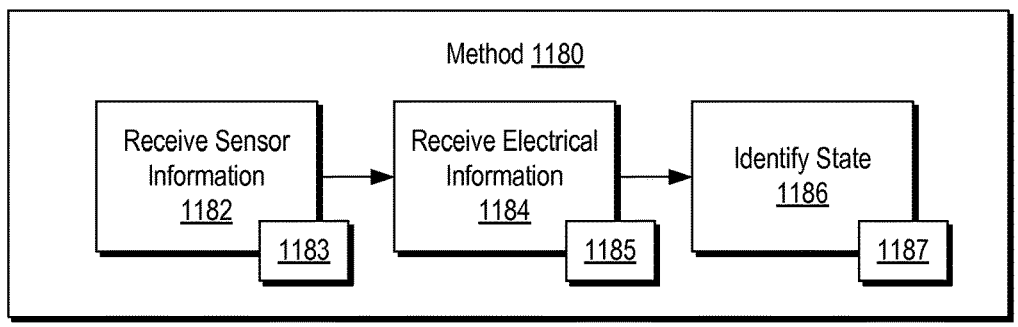
Figure 11:
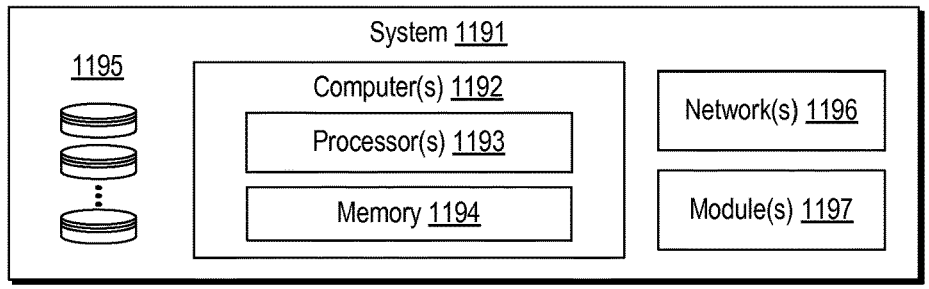

FIG. 11 shows examples of modules 1100 associated with an example of an adaptive model 1110, an example of an ESP system 1160, an example of a method 1180, and an example of a computing system 1191.

As to the modules 1100, these can include a line filter module 1114, an isolation transformer module 1116, a cable module 1152, an electric motor module 1154 and optionally one or more other modules 1156. Such modules may be part of the adaptive model 1110, which may include, for example, an electrical model of components of an ESP system such as, for example, the ESP system 1160.

As an example, a module can include states that represent states of operation of equipment. For example, the line filter module 1114 (e.g., a load filter module, etc.) can include states that represent states that may depend on input to a line filter, output from a line filter, operational temperature of a line filter, voltages within circuitry of a line filter, currents within circuits of a line filter, resistances within circuits of a line filter, etc. As an example, the isolation transformer module 1116 can include states that represent states that may depend on input to a transformer, output from a transformer, operational temperature of a transformer, voltages within circuitry of a transformer, currents within circuits of a transformer, resistances within circuits of transformer, etc. As an example, the cable module 1152 can include states that represent states that may depend on input to one or more conductors of a cable, output from one or more conductors of a cable, operational temperature of one or more portions of a cable, voltages within a cable, currents within a cable (e.g., or to ground), resistances within cable, etc. As an example, the electric motor module 1154 can include states that represent states that may depend on input to one or more conductors of a motor, output from one or more conductors of a motor, operational temperature of one or more portions of a motor, voltages within a motor, currents within a motor (e.g., or to ground), resistances within motor, operational speed of a motor, etc.

As an example, a module may include states that are based on present information, past information and/or a combination of past and present information. As an example, a module may include states that are future states. For example, if information about state-to-state transition history is known, given a series of states, a subsequent state may be estimated, optionally to occur at a particular time (e.g., or within a range of times). As an example, a probability or probabilities may be associated with a transition to a state or states. As an example, such probability or probabilities may depend on time or states that may change with respect to time.

As an example, the adaptive model 1110 may be adaptive in a state-based manner (e.g., as a state machine). As an example, the adaptive model 1110 may include a state space for an ESP system and state spaces for individual components and/or combinations of components of an ESP system.

In the example of FIG. 11, the adaptive model 1110 may be a sensorless model and/or a sensor-based model, for example, with respect to downhole sensors that may be associated with an ESP system and/or a downhole environment.

In the example of FIG. 11, the ESP system 1160 includes a drive 1170 and optionally one or more sensors 1175, which may include one or more downhole sensors and/or one or more surface sensors. As shown, the drive 1170 may operate according to a schedule 1171. For example, the schedule 1171 may be coordinated with one or more operations in the field, cost of power supplied to the drive 1170, quality of power supplied to the drive 1170, lifetime of one or more components of the ESP system 1160, etc.

As shown in FIG. 11, the schedule 1171 may be operatively coupled to receive input and/or to transmit output for the adaptive model 1110. For example, the schedule 1171 may be or include a state-based schedule that can inform the adaptive model 1110 when a state changes or states change, have changed or will change. As an example, the adaptive model 1110 may alter the schedule, for example, based at least in part on a health assessment of one or more components of the ESP system 1160, a predicted lifespan or end-of-life estimation of one or more components of the ESP system 1160, etc.

As an example, the drive 1170 may be operatively coupled to one or more of a line filter (e.g., a load filter, etc.), an isolation transform or other circuitry, which may be represented at least in part via the adaptive model 1110 (e.g., by a module, etc.). In the example of FIG. 11, the drive 1170 is operatively coupled to one or more cables to power at least one electric motor of the ESP system 1160. The one or more cables and the at least one electric motor may be represented at least in part via the adaptive model 1110 (e.g., by a module, etc.).

As an example, the adaptive model 1110 may operate based on information from the drive 1170. For example, the drive 1170 may provide information as to a change in power supplied to the drive 1170, quality of power supplied to the drive 1170, temperature of the drive 1170, voltages of the drive 1170, currents of the drive 1170, resistances of the drive 1170, etc.

As an example, the adaptive model 1110 may operate based on information from the one or more sensors 1175. For example, consider a downhole sensor such as one or more of the sensors of FIGS. 8 and 9. As an example, a sensor may sense temperature, a sensor may sense pressure, a sensor may sense vibration (e.g., acceleration), a sensor may sense position, a sensor may sense location, a sensor may sense voltage, a sensor may sense current, a sensor may sense resistance, etc.

As an example, the adaptive model 1110 of FIG. 11 may be used to assess the health of one or more components of the ESP system 1160. In such an example, the health of an electric motor, a pump or other component may be tracked following changes in state and/or load conditions at one or more points or spans of time.

As an example, loading of the ESP system 1160 can change dramatically, especially as a result of gas-liquid slugging, where the fluid density can change by an order of magnitude for one or more periods of time, which may last seconds, minutes or even hours. Such changes may result in one or more state transitions. In such an example, sensorless and/or sensor information may be received by a computing system to identify one or more ESP system states and/or component states, which may allow for assessment of health of one or more components and/or the ESP system, prediction of a lifespan, etc.

As an example, non-linear and un-symmetric conditions of a line filter (e.g., a load filter, etc.), a transformer, a cable, and a stator may be measured and used to generate a motor bulk impedance model that includes a bulk leakage inductance, a bulk serial stator resistance and a motor magnetization inductance matrix. In such an example, the adaptive model 1110 may include modules for generation of the motor bulk impedance model. As an example, the line filter module 1114, the isolation transformer module 1116, the cable module 1152 and the electric motor module 1154 may include states that are representative of one or more non-linear and/or un-symmetric conditions of corresponding equipment.

As an example, variations of combined resistance, inductance, and/or capacitances, for example, can be tracked during operation by injecting a low frequency tone superimposed to a "regular" operational signal (e.g., as input to a cable). In such an example, one or more variations (e.g., or tracking factors) may provide for one or more state identifications. As an example, such an identified state or states may be associated with a physical condition such as, for example, vibration of a component, pressure of a pump, temperature of an electric motor, temperature of a cable, fluid flow rate, fluid multi-phase composition, etc.

The adaptive model 1110 of FIG. 11 may, for example, be updated on a continuous basis and/or a periodic basis. Updating may be, for example, responsive to a change in a measured value, a schedule value, etc. As an example, a system may operate to continuously update to an adaptive model, for example, based at least in part on electrical measurements of multi-phase voltages and currents input to an electric motor of an ESP system. In such an example, the system may operate to provide a comprehensive health assessment of the ESP system and optionally predictions as to life expectancy of one or more components of the ESP system.

As an example, a system can provide for health monitoring and predicting useful remaining life of one or more components of an ESP system. In such an example, the system may account for non-idealities of a line filter (e.g., a load filter, etc.), an isolation transformer, an unsymmetrical cable, and/or asymmetry in an electrical motor. In such an example, an adaptive model may be implemented that is updated by monitoring ESP parameters such as temperature, fluid flow, and fluid composition, which may be provided by one or more pieces of downhole monitoring equipment.

As an example, a system may provide information as to degradation in performance of one or more pump stages, failure of one or more bearings, etc. As an example, such information may be based at least in part on a mechanical vibrational spectrum of a downhole pump and its interaction with loading of an electrical motor, which can depend on how the pump is mounted. As an example, such information may be based at least in part on assignment of particular resonant modes to one or more sets of bearings in an electric motor, a protector and/or one or more pump stages. As an example, a system can include sensors for making measurements that may be distributed along an electric motor, a protector and/or one or more pump stages. Such information may be used to refine an adaptive model such as, for example, the adaptive model 1110 for purposes of state identification, state transitioning, predictive health monitoring, etc.

As an example, a method can include estimating equipment health and predicting life expectancy of one or more components of an ESP system utilizing a model of the ESP system, which may be complimented with downhole measurements such as measurements of motor phase currents and voltages, pressures, temperatures, vibrations, flowrate, fluid composition, etc.

As an example, a method for determining remaining useful life of one or more components of an ESP system may include correlating multiple input signals from sensors at surface as well as downhole sensors, mounted on and around an ESP system, for example, to assess via a model health of an electric motor and/or pump components (e.g., bearings, seals, electrical isolation weakness, etc.).

In FIG. 11, the method 1180 includes a reception block 1182 for receiving sensor information from at least one sensor disposed in a downhole environment that includes an electric submersible pump operatively coupled to a power drive via a cable; a reception block 1185 for receiving electrical information associated with transmission of power via the cable; and an identification block 1186 for identifying a state of the electric submersible pump via an adaptive model of at least the cable and the electric submersible pump based at least in part on a portion of the sensor information and a portion of the electrical information. In such an example, an identified state may be associated with a health status and/or a lifespan of a piece or pieces of equipment.

As shown in FIG. 11, the method 1180 may be associated with various computer-readable media (CRM) blocks 1183, 1185 and 1187. Such blocks generally include instructions suitable for execution by one or more processors (or cores) to instruct a computing device or system to perform one or more actions. As an example, a single medium may be configured with instructions to allow for, at least in part, performance of various actions of the method 1180. As an example, a computer-readable medium (CRM) may be a computer-readable storage medium that is non-transitory and that is not a carrier wave. As an example, blocks may be provided as one or more modules.

In FIG. 11, the system 1191 may include one or more computers 1192, one or more storage devices 1195, one or more networks 1196 and one or more modules 1197. As to the one or more computers 1192, each computer may include one or more processors (e.g., or processing cores) 1193 and memory 1194 for storing instructions (e.g., modules), for example, executable by at least one of the one or more processors. As an example, a computer may include one or more network interfaces (e.g., wired or wireless), one or more graphics cards, a display interface (e.g., wired or wireless), etc. As an example, data may be provided in the storage device(s) 1195 where the computer(s) 1192 may access the data via the network(s) 1196 and process the data via the module(s) 1197, for example, as stored in the memory 1194 and executed by the processor(s) 1193. As an example, a computer-readable storage medium may be non-transitory and not a carrier wave. Such a storage medium may store instructions and optionally other information where such instructions may be executable by one or more processors (e.g., of a computer, computers, a controller, controllers, etc.).

Figure 12:
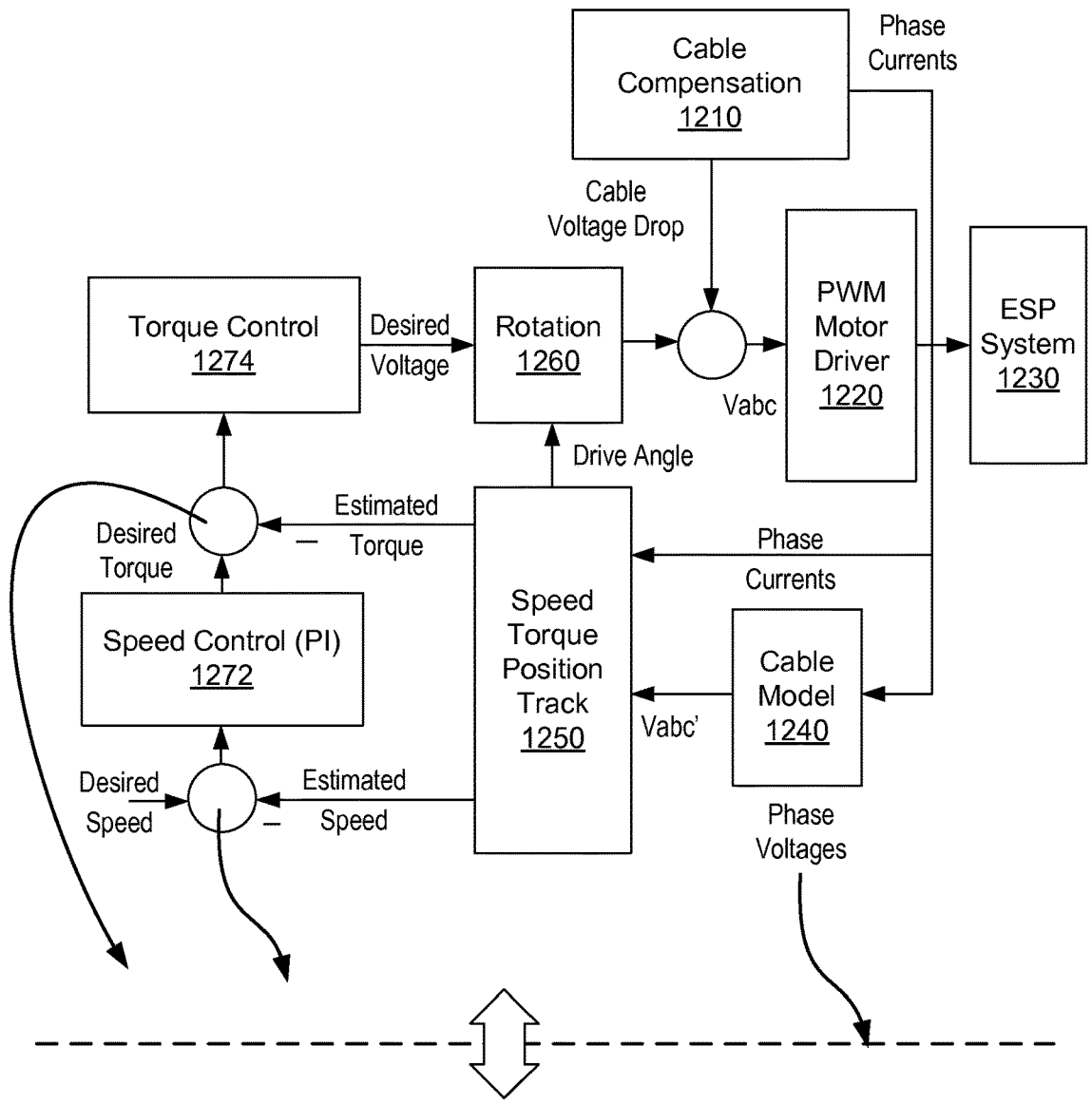
FIG. 12 illustrates an example of a system.

FIG. 12 shows an example of a system 1200 that can control a system and that can include assessing health and/or predicting life of one or more components of a system, for example, via an assessment and/or life prediction computation system 1280 that includes a system and/or plant model 1282 and one or more analysis modules 1284 (e.g., for statistical analysis, neural network analysis, fuzzy logic analysis, etc.).

As shown, the system 1200 includes a cable compensation block 1210, a PWM motor driver block 1220, an ESP system block 1230, a cable model block 1240, a speed, torque and position track block 1250, a rotation block 1260, a speed control block 1272 (e.g., consider PI control), and a torque control block 1274.

As an example, compensation for cable drop may be based on nominal cable parameters. For example, in the example of FIG. 12, consider control and/or tracking based on motor terminal voltages. In such an example, a control loop may run on a symmetrical motor model.

As an example, to get from the desired voltage Vabc' of a torque (and for IM motors also flux) control loop at the motor terminals to the driver voltage Vabc the serial cable drop can be added.

$$Vabc=Vabc'+Zcable*Iphase$$

where Zcable may be a 3 by 3 matrix (e.g., for three-phase), which describes the Laplace transform of the serial impedance, which includes the resistance, and the inductance (including mutual inductance) and if appropriate also capacitance.

As a next process after measurement of the phase currents, the motor terminal voltage, as for a tracking algorithm and control, may be calculated from an inverse relationship, for example, as follows:

$$Vabc'=Vabc-Zcable*Iphase$$

As to control, as an example, an approach may consider compensation of the unsymmetrical portion of the cable drop. In such an example, an approach can include compensating for the unsymmetrical part of the cable impedance. Such an approach may consider the fact that the loop area of the mutual inductance of the two outer conductors is larger than the mutual inductance of the inner line to the two outer lines (e.g., in a three-phase scenario). In such an example, the symmetrical part of the cable impedance can be combined with the motor stator input impedance, for example, as follows:

$$Zcable=Zcable\_sym+Zcable\_unsym$$

In such an approach, it may be relatively straightforward to track change in cable resistance, to implement tracking and control on a symmetrical model while still compensating for the unsymmetrical part through control.

As an example, an approach may consider fuller compensation by combination of the transformer, line filter (e.g., a load filter, etc.), cable and stator impedance (e.g., a full compensation approach).

In a system identification approach, various parameters of an ESP system can vary over time and from setup to setup. As an example, a model variation can be accounted for in different categories. In an initial phase before pump operation various parameters can be identified, for example, without actually running a pump. Such parameters may be measured and used for tracking and/or control. On the other hand there are parameters that vary over time particularly, because they are affected by, for example, temperature. For example, consider cable resistance and motor and stator resistance as being temperature dependent. Further, where temperature varies spatially as well as temporally, such parameter may vary spatially and temporally as well, which may lead to asymmetries in multiphase power supply to a motor that can vary over time.

As an example, a system may aim to provide consistency between model parameters and corresponding physical system components, which can thereby facilitate one or more of control, regulation, tracking, etc. For example, where a system includes an ESP operatively coupled to a power cable that is operatively coupled to a drive unit, a method can include providing model parameters that correspond to various aspects of the system. In such an example, parameter errors may be analyzed as to estimation errors of estimated speed, estimated applied torque, real time cable/stator and rotor resistance estimation.

As indicated in the example of FIG. 12, the estimated errors may be received by the assessment and/or life prediction computation system 1280. In such an example, the estimated error values may optionally be analyzed with other information, for example, to assess one or more components, to predict a life expectancy of one or more components, etc. As an example, control information can include one or more control actions (e.g., control states) and/or one or more estimated errors. As an example, such control information may be analyzed to assess health and/or to predict lifetime (e.g., life expectancy) of one or more components of an ESP system.

As to line inductance, initial resistance and magnetization, consider bulk inductance of an optional transformer, line filter, cable and motor stator, which may be readily measured by injecting a stator voltage signal at a constant drive angle. As an example, amplitude can be modulated at different frequencies. As an example, measurement can be repeated for different directions for instance in A, B and C direction. Also consider, as an example, that with constant drive angles no voltage is induced into the rotor, it will not move and have no impact.

As an example, a measurement can be superimposed with a DC component. By the measurement of the phase current, three parameter sets can be identified as DC resistance in A, B and C directions and inductance including saturation effects on the inductance in A, B and C directions.

As an example, before starting a new installation, inductance measurements may be combined with magnetization measurements of the motor standalone and the line filter stand alone.

As to real time identification, methods can be applied while actively operating the motor. On top of the normal excitation currents a superimposed AC current signal with a constant angle (e.g., for closed loop control) can be applied to gain more information for parameter identification.

As an example, a method can include a system identification process for model validation and tuning (e.g., adaptation, etc.) and can include a discrepancy identification process for identifying discrepancies between the model and a real system, for example, to determine health of the real system. For example, consider a system test or tests that can include diagnosis and health monitoring over time. As an example, reduction of cable/stator inductance may be an indicator of one or more shorts in a winding or windings. As another example, a change in resistance or a change in common mode leakage currents may indicate a developing break down of cable insulation. As an example, an estimated error may be a discrepancy and may correspond to one or more component states.

As an example, a GLR, GVF, etc., may change in a downhole environment and cause a change of state, which may be identified, for example, at least in part via an estimated error or estimated errors. For example, gas within a pump may cause a change in load, which may cause a change in temperature of one or more motor components. Such changes may be detectable via one or more sensors, one or more forms of electrical information (e.g., as derived via an injected signal, etc.), etc. As an example, a gas-related issue may call for control such as a controlled change in speed of an electric motor that drives a pump, which may include shutting down the pump for a period of time followed by starting up the pump (e.g., a ramp up operation). Control information (e.g., control behavior, etc.) may be considered in assessing health, etc. As an example, errors and/or error estimates (e.g., between desired or targeted values and actual or estimated values) during implementation of control may be control information. As mentioned such control actions (e.g., states and state transitions) can impact health, longevity, etc. A system may log historic information (e.g., optionally as state information) and/or adapt a model based at least in part on historic information (e.g., number of shut downs, start-ups, gas-related events, temperatures, pressures, flow rates, resistances, voltages, currents, etc.).

As an example, a method can include operating a controller that includes an input that receives measurements as to power supplied to a multiphase electric motor via a multiphase power cable and that processes the measurements to estimate one or more variables associated with the multiphase electric motor; and using the one or more variables associated with the multiphase electric motor to assess health of the multiphase electric motor, optionally including estimating life expectancy of the multiphase electric motor. As an example, a method may include controlling one or more variables so as to improve the run life of the multiphase electric motor.

Figure 13:
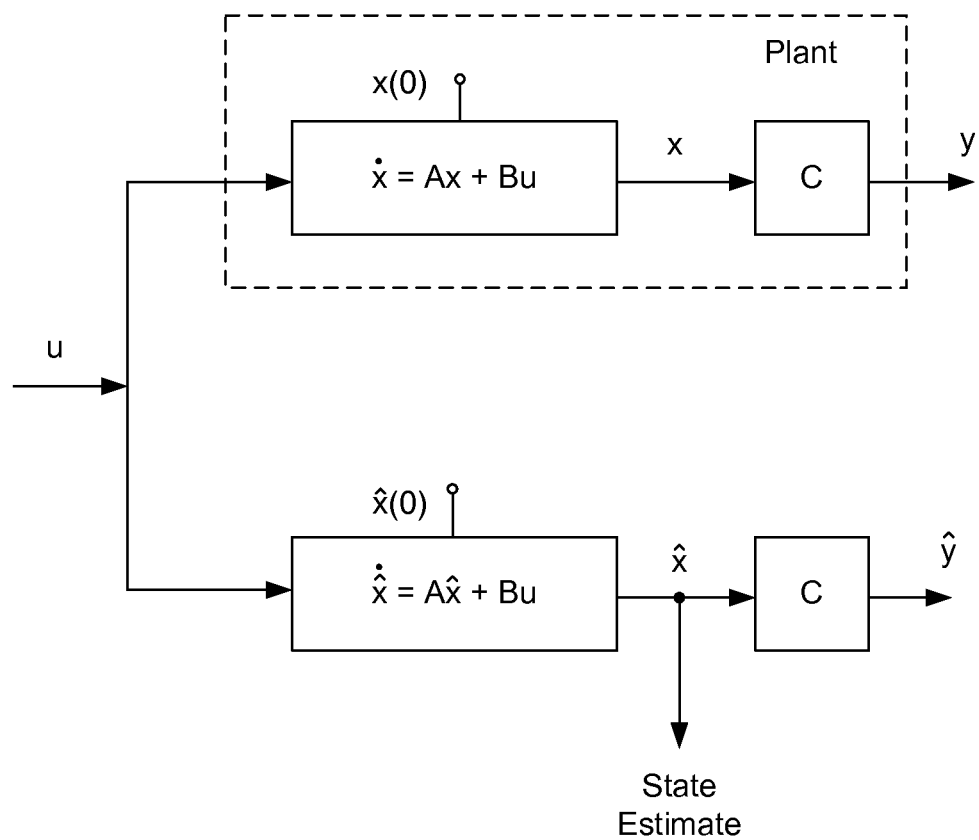
FIG. 13 illustrates an example of a model.
Figure 14:
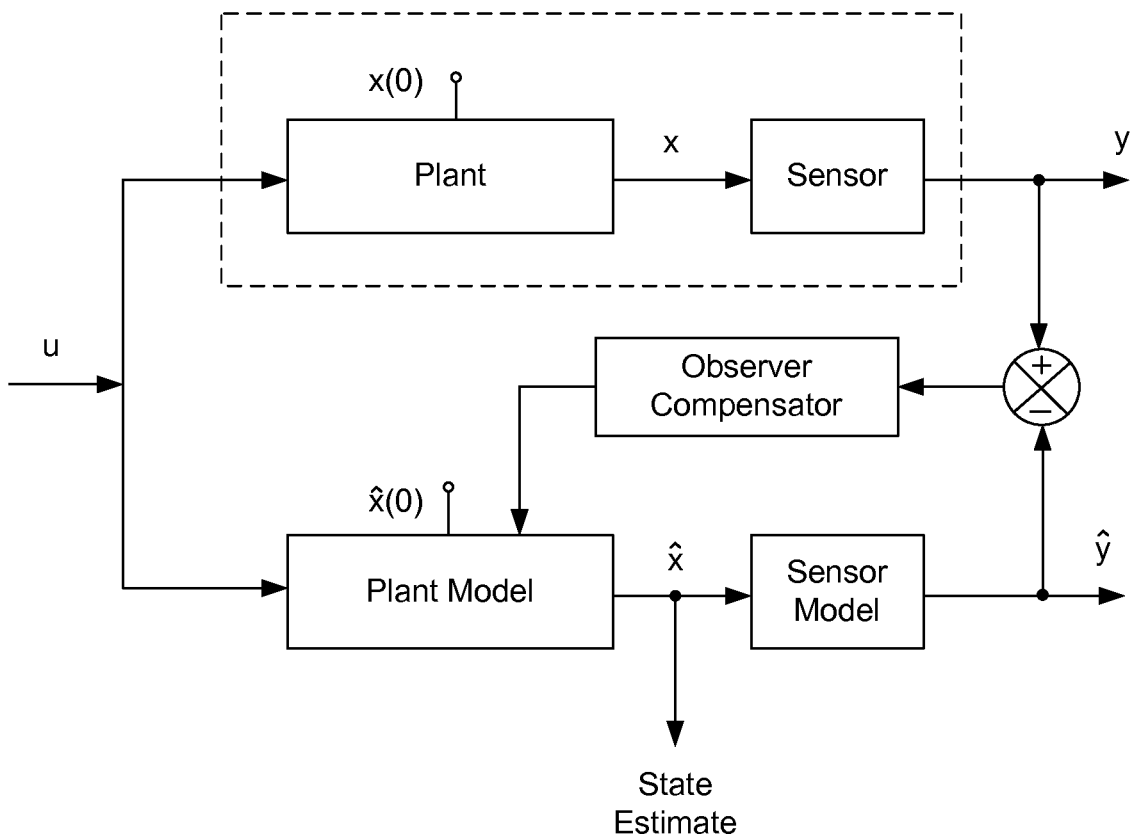
FIG. 14 illustrates an example of a model.

As an example, an approach may include an adaptive Luenberger observer structure. FIG. 13 shows an example of a plant and reference 1300 while FIG. 14 shows an adaptive Luenberger observer 1400. For motor operation with long cables with time varying parameters and potential asymmetries, an approach may include tracking of variation through adaptive filters. For electrical motors adaptive filters tend to be based on current or flux prediction. The prediction is based on a continuous correction of the system state variables and system parameters based on the prediction error. Classical Luenberger observers use the measurement vector prediction error to adjust the system state variables. Adaptive Luenberger observers also use the prediction error to adjust the system parameters as well. Particularly for a tracking filter with long cables and strong impact of temperature the fact that the reference model parameters subject to wide variation may have a dominating impact on the quality of the result.

As an example, consider a real system described in state space by the system model:

$$\frac{d\underline{x}}{dt} = \underline{A}\,\underline{x} + \underline{B}\,\underline{u}$$

where $\underline{x}$ is the system variable vector, $\underline{A}$ include the system parameters, $\underline{u}$ describes the excitation and $\underline{B}$ the sensitivity of the system variables to the excitation.

A tracking model may be described in a similar way, but including a correction term.

$$\frac{d\hat{\underline{x}}}{dt} = \hat{\underline{A}}\,\hat{\underline{x}} + \hat{\underline{B}}\,\underline{u} + \underline{G}(\underline{y} - \underline{y}^*)$$

In the foregoing equation, the vector $\underline{y}$ describes the measurement vector and $\underline{y}^*$ its predicted value. The matrix $\underline{G}$ is the feedback gain that gives a weight and sign to the prediction error feedback. The "^" sign in the matrix $\hat{\underline{A}}$ and $\hat{\underline{B}}$ indicate that they are idealized or estimated values of the physical system. While this is a vector approach for Luenberger, for sensorless control of motors on long cables; as an example, the system matrix $\underline{A}$ can be dynamically adapted based on one or more operational conditions.

As an example, for IM motors, an adaptive Luenberger observer structure approach may be implemented. There are various tracking filter structures for sensorless motor control of induction motors. For the application on long cables however the parameter variation can be large and may degrade quality of speed estimation. The bulk resistance of the filter, cable and stator may change with temperature and have to be tracked. Also rotor resistance can change with temperature. Therefore, as an example, an approach may account for rotor and stator resistance as well in a comprehensive tracking structure.

As an example, consider a system variable vector approach where vectors may be defined as follows:

$$\underline{x} = [I_{ds}, I_{qs}, \Phi_{dr}, \Phi_{qr}]^T$$

$$\underline{u} = [V_{ds}, V_{qs}]^T$$

where $I_{ds}$, $I_{qs}$ are the stator currents in the stationary reference frame and $\Phi_{dr}$, $\Phi_{qr}$ are the rotor flux variables.

$$\underline{A} = \begin{bmatrix} -\left\{\frac{R_s}{\sigma L_s} + \frac{(1-\sigma)}{\sigma \tau_r}\right\}I & \frac{M}{\sigma L_s L_{sr}}\left\{\frac{1}{\tau_r}I - \omega_r J\right\} \\ \frac{M}{\tau_r}I & -\frac{1}{\tau_r}I + \omega_r J \end{bmatrix}$$

$$\underline{B} = \left[\frac{1}{\sigma L_s}I \quad 0\right]^T$$

$$\underline{C} = [I \quad 0]^T$$

$$I = \begin{bmatrix} 1 & 0 \\ 0 & 1 \end{bmatrix} \quad J = \begin{bmatrix} 0 & -1 \\ 1 & 0 \end{bmatrix}$$

$R_s$, $R_r$: Stator and rotor resistance
$L_s$, $L_{sr}$: Stator and rotor self inductance
M: Mutual inductance
σ: Leakage coefficient $\sigma = 1 - M^2/(L_s L_{sr})$
$\tau_r$: Rotor time constant $\tau_r = L_r/R_r$
$\omega_r$: Rotor angular velocity As an example, based on a Lyapunov function it can be shown that the system is stable for the right selection of the feedback matrix $\underline{G}$ (e.g., as part of a "correction" term that can provide weight and sign to a feedback error).

As an example, stator and rotor resistance can be estimated by a scheme that can include the following equations:

$$\frac{d\hat{R}_s}{dt} = -\lambda_1 \left(e_{ids}\hat{\imath}_{ds} + e_{iqs}\hat{\imath}_{qs}\right)$$

$$\frac{d\left(\frac{1}{\hat{\tau}_r}\right)}{dt} = \frac{\lambda_2}{L_r}\{e_{ids}(\hat{\phi}_{dr} - M\hat{\imath}_{ds}) + e_{iqs}(\hat{\phi}_{qr} - M\hat{\imath}_{qs})\}$$

$e_{ids}$, $e_{iqs}$: current prediction errors
$\lambda_1$, $\lambda_2$: filter constants As an example, filter constants can determine dynamics of tracking as well as, for example, sensitivity to noise. Since stator and rotor resistance may not change as fast, slow resistance tracking may be sufficient. As an example, too fast resistance tracking can bare a high risk of oscillation, for example, based on the impact of the overall tracking.

As an example, a scheme to estimate stator and rotor resistance may be underdetermined for steady state operation. Therefore, an additional tone can be superimposed to the excitation (e.g., an injected signal, etc.). A scheme of induction motor control may be understood as follows: rotor flux is controlled through a stator current $i_{ds}$, which is low pass filtered by the rotor time constant $\tau_r$ to get to the rotor flux, and the stator current $i_{qs}$ is used for dynamic torque control. By an excitation to modulate $i_{ds}$ the impact of the rotor time constant can be measured; noting that a modulation of $i_{qs}$ is dominated by the stator resistance. The excitation for $i_{ds}$ may be selected to be fast enough to see an impact on the rotor time constant. In such an approach, both excitations can lead to additional torque ripple.

As to speed tracking estimation, consider, as an example, the following equation:

$$\hat{\omega}_r = k_p(e_{ids}\hat{\Phi}_{qr} - e_{iqs}\hat{\Phi}_{dr}) + k_i\!\int(e_{ids}\hat{\Phi}_{qr} - e_{iqs}\hat{\Phi}_{dr})dt$$

Based on a tracked velocity, that is based on a rotor time constant and stator resistance, one or more methods of vector oriented control (VOC) may be implemented.

Figure 15:
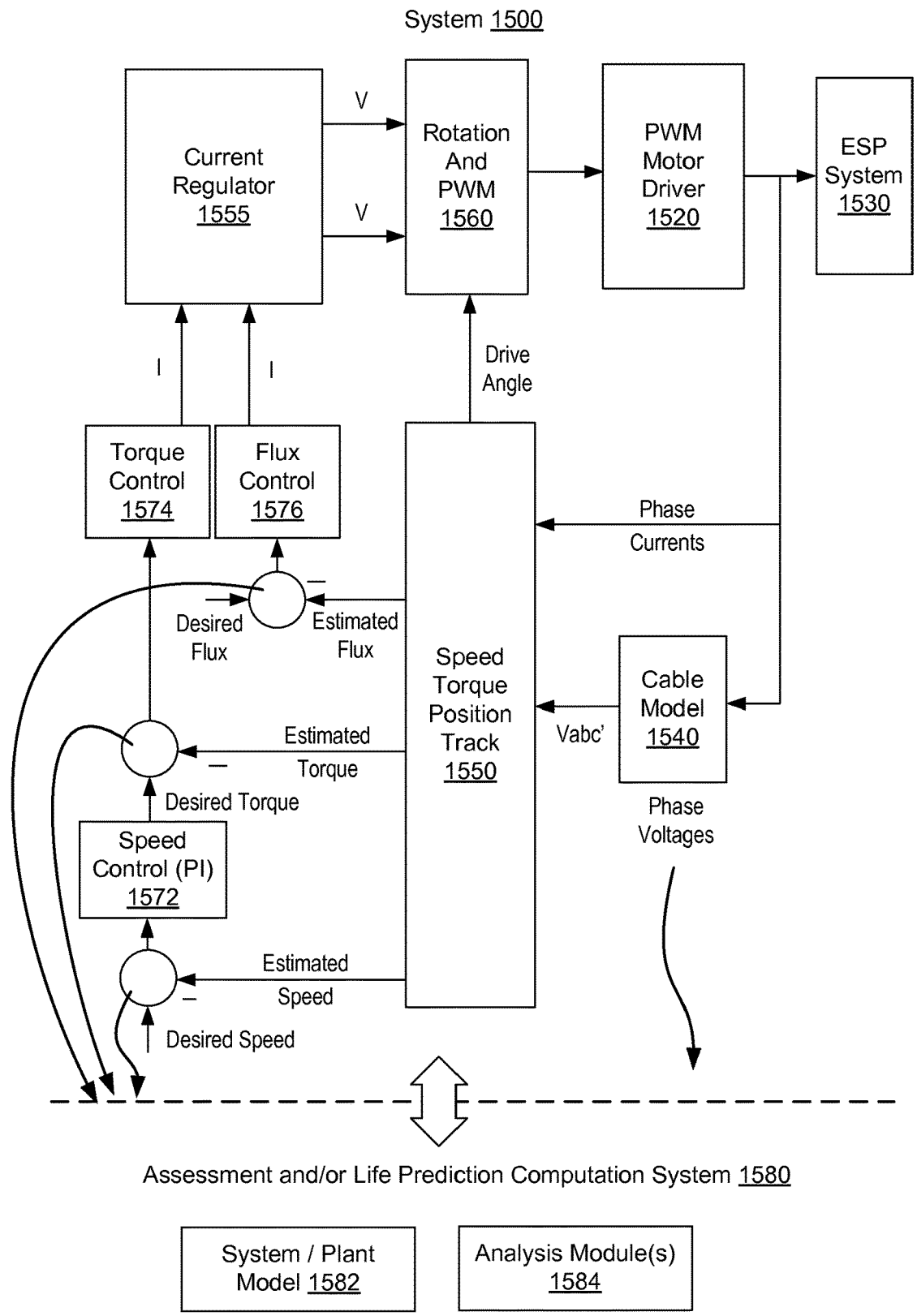
FIG. 15 illustrates an example of a system.

FIG. 15 shows an example of a system 1500 that can control a system and that can include assessing health and/or predicting life of one or more components of a system, for example, via an assessment and/or life prediction computation system 1580 that includes a system and/or plant model 1582 and one or more analysis modules 1584 (e.g., for statistical analysis, neural network analysis, fuzzy logic analysis, etc.). As an example, control information can include one or more control actions (e.g., control states) and/or one or more estimated errors (e.g., a difference between a desired value and an estimated value). As an example, such control information may be analyzed to assess health and/or to predict lifetime (e.g., life expectancy) of one or more components of an ESP system.

As shown, the system 1500 includes a PWM motor driver block 1520, an ESP system block 1530, a cable model block 1540, a speed, torque and position track block 1550, a current regulator block 1555, a rotation and PWM block 1560, a speed control block 1572, a torque control block 1574, and a flux control block 1576.

As shown, in the example of FIG. 15, torque control with vector oriented control can be implemented. In such an example, speed estimation can be provided for speed control and torque control. As an example, a change in rotor time constant can affect speed estimate and torque.

As explained, speed tracking may be possible in open loop operation. However tracking of stator resistance and rotor resistance may be achieved where currents vary (e.g., varying currents); because, under steady state conditions rotor and stator resistance tracking can become ambiguous. As an example, a speed estimator may be based on the nominal resistance and approximation based on the temperature coefficient and a temperature estimate from other sources.

However, as to compensation for cable asymmetry, it can be based on a similar principle as before. As an example, the effects of the asymmetry can be accounted for by accounting for the asymmetrical voltage drop across the cable. In such an example, the tracking filter can then be based on a symmetrical motor model.

Figure 16:
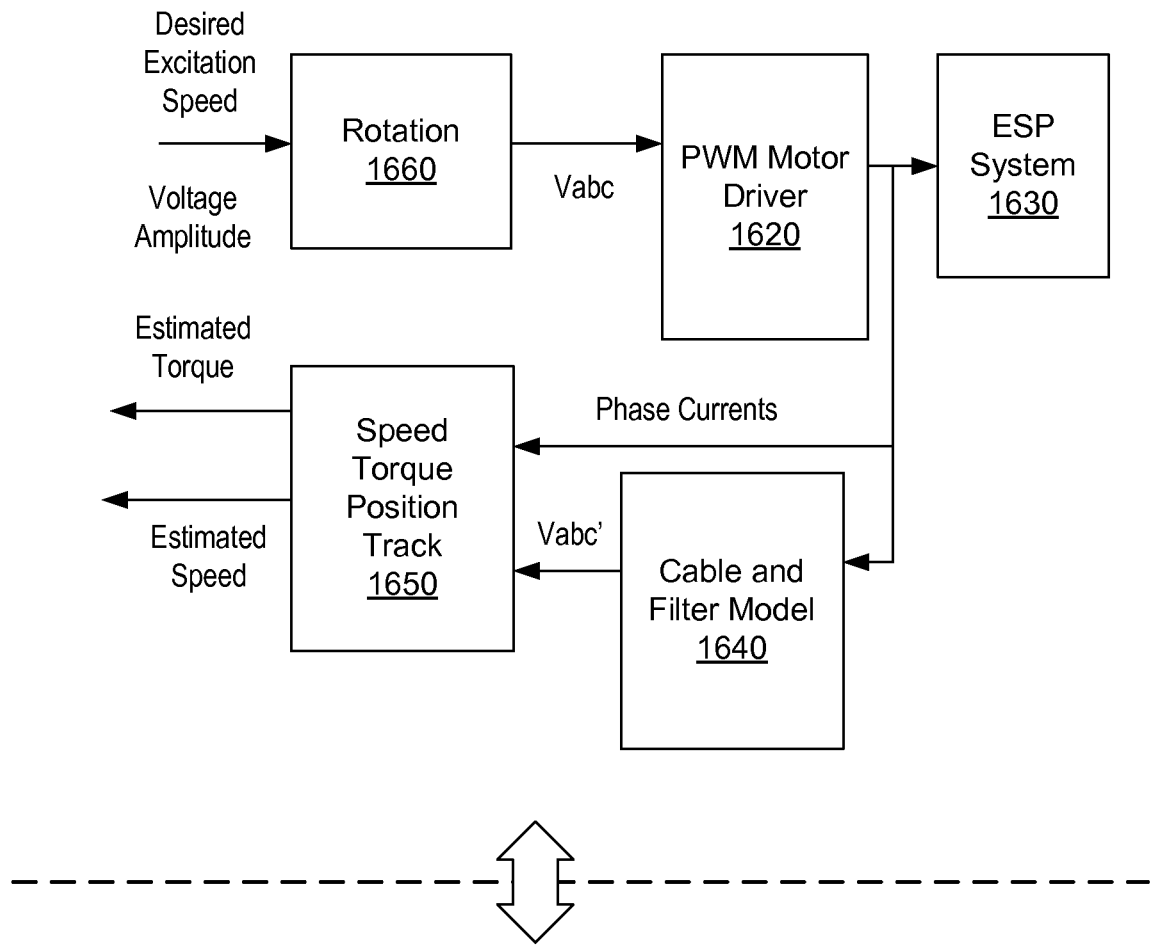
FIG. 16 illustrates an example of a system.
Figure 16:

FIG. 16 shows an example of a system 1600 that can control a system and that can include assessing health and/or predicting life of one or more components of a system, for example, via an assessment and/or life prediction computation system 1680 that includes a system and/or plant model 1682 and one or more analysis modules 1684 (e.g., for statistical analysis, neural network analysis, fuzzy logic analysis, etc.). As an example, control information can include one or more control actions (e.g., control states) and/or one or more estimated errors (e.g., a difference between a desired value and an estimated value). As an example, such control information may be analyzed to assess health and/or to predict lifetime (e.g., life expectancy) of one or more components of an ESP system.

As an example, the system 1600 may implement open loop operation, for example, for speed and torque estimation in open loop operation. As shown, the system 1600 includes a PWM motor driver block 1620, an ESP system block 1630, a cable and filter model block 1640, a speed, torque and position track block 1650 and a rotation block 1660.

In the example of FIG. 16, there is still an option as to how to track the rotor and stator resistance. If there is not enough load fluctuation for tracking, even in open loop an extra tone can be implemented in the driver. The extra tone of the drive voltage will create a fluctuation on the stator currents that can then be used for tracking (e.g., electrical information for state identification, etc.). However, in open loop operation, it may add a torque ripple.

As to PMS motors, they tend to be not as complex as IM motors. As an example, cable and stator impedances can be combined for control or tracking.

Figure 17:
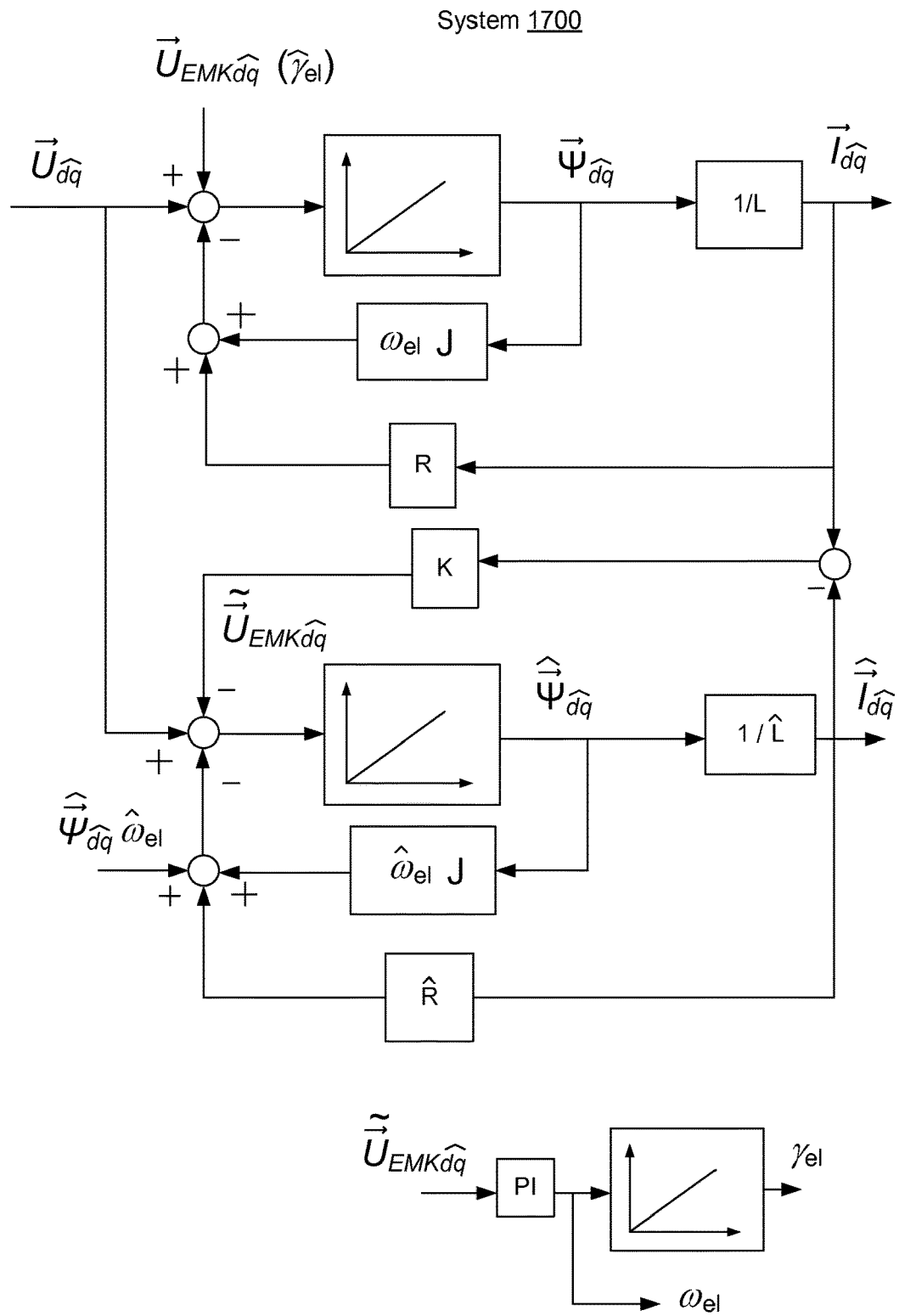
FIG. 17 illustrates an example of a system.

FIG. 17 shows a block diagram of a system 1700 for current prediction based position estimator in rotor coordinates. The fact that the cable resistance can change substantially, it can have an impact that may benefit from compensation. As an example, an observer can be extended to adapt for cable resistance change as well. For example, it is possible to inject a low frequency signal in a direction of the rotor. In such an example, additional voltage drop created along the cable accounts for the resistance.

As an example, the system 1700 of FIG. 17 may be considered an example embodiment of a current predictor based tracking filter. The drive voltage can be applied to a plant model and projected into the estimated rotor position. A reference model with nominal or estimated system parameters can predict the response of the system to the excitation by the drive voltage. The error between measured and predicted current can be used to calculate a back EMF prediction error, for example, to adjust for the discrepancy in the model and/or to assess one or more conditions that may be related to health of one or more components. The back EMF error has after linearization a dependency on the angle error in the d direction and on speed error in the q direction. As an example, both contributors can be combined with a weight factor and used in a loop scheme (e.g., phase locked loop (PLL)). As an example, a PLL scheme can track the speed and, after integration, the angle.

As to nomenclature, consider the following:

$\vec{U}_{EMK\widehat{dq}}$ : True back EMF $\widetilde{U}_{EMK\widehat{dq}}$ : Back EMF prediction error $\hat{\gamma}_{el}$: Estimated electrical rotor angle $\vec{U}_{\widehat{dq}}$ : Drive voltage in estimated rotor coordinates, based on angle estimation $\vec{I}_{\widehat{dq}}$ : Measured current in estimated coordinates, based on angle estimation $\vec{\Psi}_{\widehat{dq}}$ : True Flux in plant in true position L: True Phase Inductance $\omega_{el}$: True electrical motor speed R: True phase resistance K: observer gain $\hat{\vec{I}}_{\widehat{dq}}$ : Predicted current in estimated coordinates, based on angle estimation $\hat{\vec{\Psi}}_{\widehat{dq}}$ : Predicted Flux in plant in estimated position $\hat{L}$: Nominal inductance $\hat{\psi}_{PM}$: Nominal field constant $\hat{\omega}_{el}$: Estimated electrical motor speed $\hat{R}$: Nominal resistance, or estimated resistance from adaptive tracker As an example, rotor shaft reliability improvement may be accomplished in a closed loop regulator design. For example, speed regulator may be dominated by inertia of a rotor and damping of a load. However, tracking of the rotor speed can add an opportunity to design the speed control to include a dynamic model of the shaft. The regulator can be designed to provide extra damping in the resonance region of the shaft and therefore improve lifetime and reliability of the shaft. With the estimated speed and controllable actuation torque through the stator current sudden torque change can be minimized.

As an example, a start-up strategy may include an open loop closed loop transition. A strategy for induction motor open loop ramp up may be based on scalar methods where voltage is ramped up proportional to the frequency ramp up of the excitation.

$$V(t)=V_0+V_1\omega t e^{j\omega t}$$

$V_0$ is a constant that limits the start-up current.

$V_1$ is the rate at which the voltage ramps up.

$\omega$ is continuously increasing until the target excitation frequency is reached.

Such an approach can be considered to be a scalar or voltage per Hertz ramp up method. For example, it can attempt to avoid tripping over-current protection by ramping up voltage and slip slowly with the assumption that the rotor has started to ramp up speed by the time voltage and the slip are sufficiently high.

As an example, a method akin to the foregoing may be implemented for PMS motors, for example, based at least in part on a self-regulating mechanism of a PMS motor. As to a PMS motor, consider the following equation:

$$V(t)=V_0\Phi_j\omega t e^{j\omega t}$$

$V_0$ is a constant that limits the phase current.

$\omega$ is continuously increasing until the target excitation frequency is reached.

In such an approach, the rate of voltage ramp up corresponds to the ramp up of the back EMF. Such methods achieve suitable results if the rotor ramps up acceptably; noting that overdesign of the drive may help to avoid over-currents that can go to the limit of the drive. For PMS, overdrive of the system can occur so that enough start-up torque is developed. As speed ramps up, this method may be sensitive to misfiring; noting that at higher voltages, small misalignments may create large current spikes.

Figure 18:
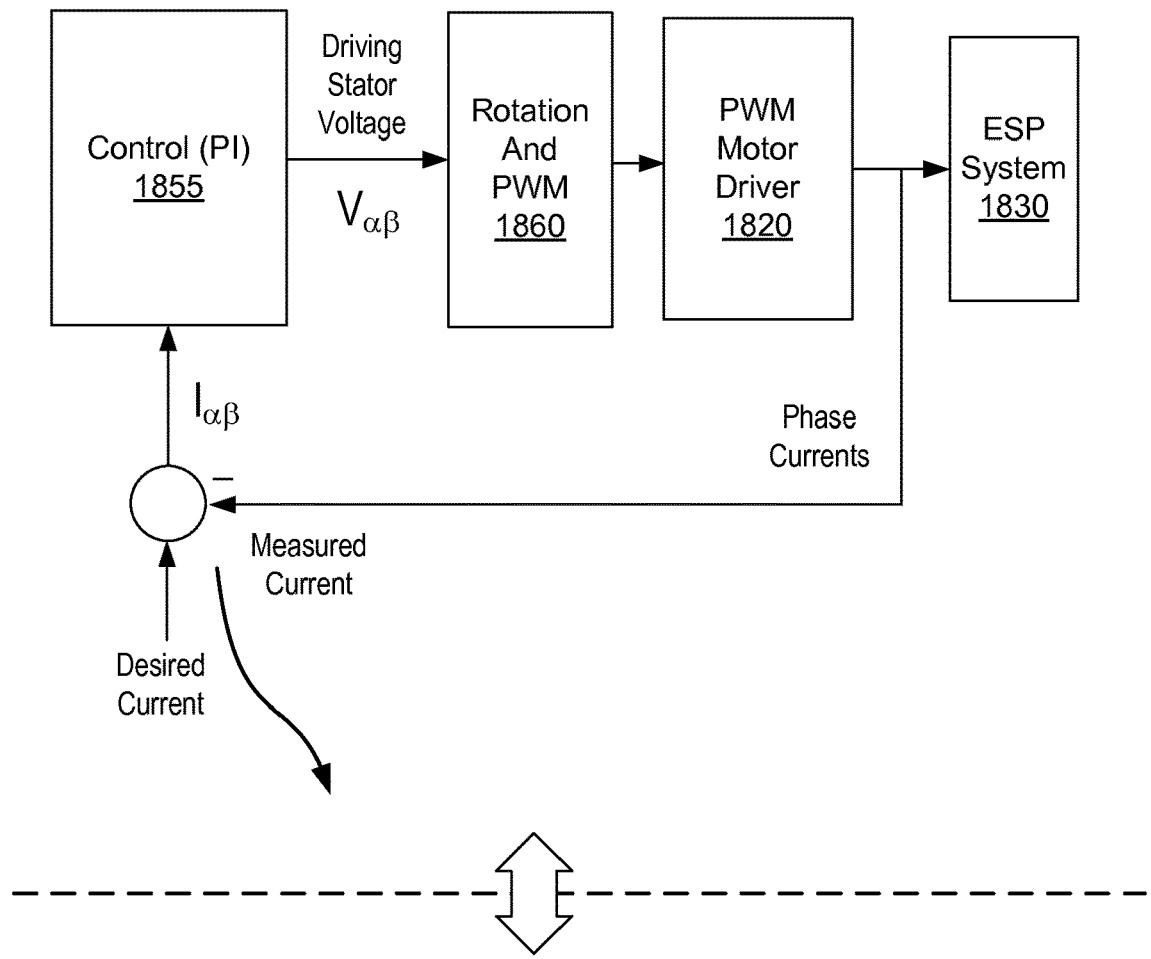
FIG. 18 illustrates an example of a system.
Figure 18:

FIG. 18 shows an example of a system 1800 that can control a system and that can include assessing health and/or predicting life of one or more components of a system, for example, via an assessment and/or life prediction computation system 1880 that includes a system and/or plant model 1882 and one or more analysis modules 1884 (e.g., for statistical analysis, neural network analysis, fuzzy logic analysis, etc.). As an example, control information can include one or more control actions (e.g., control states) and/or one or more estimated errors (e.g., a difference between a desired value and an estimated value). As an example, such control information may be analyzed to assess health and/or to predict lifetime (e.g., life expectancy) of one or more components of an ESP system. As an example, the system 1800 may be implemented for active current controlled ramp up (e.g., during a start-up state, etc.). As shown, the system 1800 includes a PWM motor driver block 1820, an ESP system block 1830, a control block 1855 and a rotation and PWM block 1860.

As an example, to ramp up in a more controlled way for both IM and PMS motors, the voltage ramping up current through a control loop can create a more controlled way to limit the current. In such an example, voltage may automatically ramp up through the output of a PI regulator (see, e.g., block 1855). Since there is more mitigation against overcurrent, the nominal ramp up current can be much higher and much closer to the overall current limit of the system, which means more robustness and reduced design consideration as to oversize the drive capability. For PMS motors it may also help to guarantee for the same condition higher torque, which can result in less probability for slip and less rotor speed ripple:

$$I(t)=I_{max}e^{j\omega t}$$

In this case, the current ramps up fast and then stays constant while $\omega$ is continuously increasing. The driven voltage will still ramp up with the speed, but, for example, automatically adjust to stay close to the maximum current.

As an example, an approach may include open loop closed loop transition(s). For example, while ramping up speed, the tracking filters can be running, and once the signal noise ratio is sufficiently high and the convergence of the tracking filters can be trusted, the system can switch to closed loop. As an example, during ramp down of speed, a system may be instructed to switch back to open loop, for example, at a point when the tracking filters lack trust (e.g., insufficient signal to noise).

In a transition, a sudden discontinuity may occur that may create sudden jumps in driver signals that may possibly lead to overcurrent conditions. As an example, to mitigate such an issue, the integrator implementation of PI controls may be initialized for continuity. For example, consider the following equations:

$$E_{rr\_1} = I_{1\_desired} - I_{1\_estimated}$$

-continued $$V_{k+1} = K_p E_{rr\_i} + K_i \sum_{i=0}^{k+1} E_{rr\_i}$$

$$Acc_{K+1} = \sum_{i=0}^{k+1} E_{rr\_i}$$

$$Acc_1 = \frac{V_0 - K_p E_{rr\_1}}{K_i}$$

$Acc_1$: Accumulator state when regulator starts
$V_0$: Last regulator state in open loop
$I_{\_k}$: state of regulated signal, measured or estimated
$E_{rr\_k}$: Error signal Such an approach means, when the control becomes active, the integrator is designed for the output to stay continuous at the first sample of closing the loop.

As an example, various approaches may be implemented for PMS. For example, there are different types of tracking speed tracking filters. Sliding mode observers and flux estimators may be more straightforward to implement and to design, however with limited performance. Current or flux predictor based tracking may be implemented; however, design may be more complex. Extended Kalman filters may be considered; however, the quality of the tracked speed may be balanced against an implementation effort.

As an example, as to other IM motor speed estimators, there are various types of speed estimators for induction motors. The basic principle may be to converge to a model state (and for adaptive filters also model parameter state), where the response to voltage excitation signals in the measured currents is consistent with the system model. In various examples, as explained, a tracking mechanism relates to a current prediction error.

Figure 19:
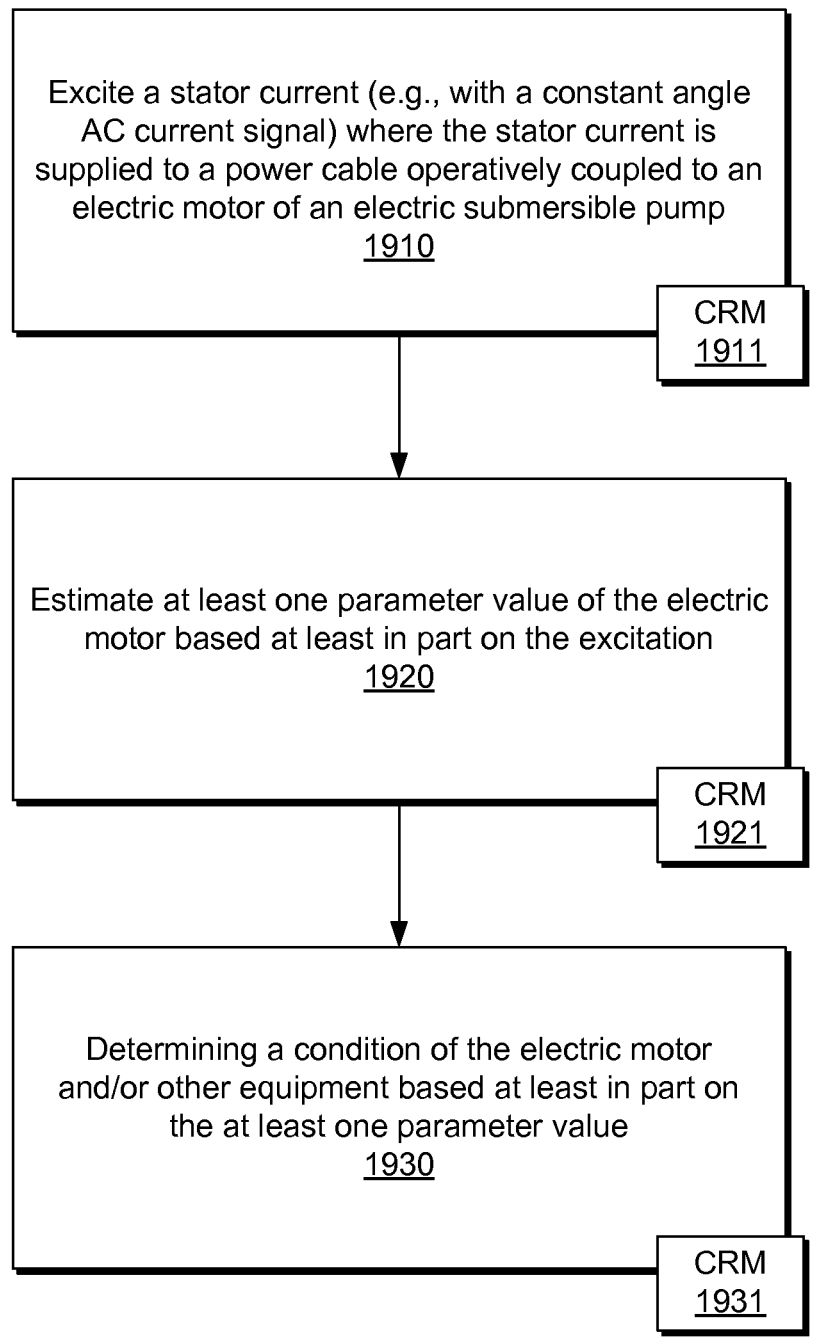
FIG. 19 illustrates an example of a method.

FIG. 19 shows an example of a method 1900 that includes an excitation block 1910 for exciting a stator current with a constant angle AC current signal where the stator current is supplied to a power cable operatively coupled to an electric motor of an electric submersible pump; a estimation block 1920 for, based at least in part on the exciting, estimating at least one parameter value of the electric motor; and, a determination block 1930 for, based at least in part on the at least one parameter value, determining a condition of the electric motor and/or other equipment (e.g., a pump, etc.). In such an example, based at least in part on the at least one parameter value, the method 1900 can include estimating a pump rate of the electric submersible pump and/or one or more other types of information germane to the electric submersible pump, the power cable, the electric motor, etc.

As shown in FIG. 19, the method 1900 may be associated with various computer-readable media (CRM) blocks 1911, 1921 and 1931. Such blocks generally include instructions suitable for execution by one or more processors (or cores) to instruct a computing device or system to perform one or more actions. As an example, a single medium may be configured with instructions to allow for, at least in part, performance of various actions of the method 1900. As an example, a computer-readable medium (CRM) may be a computer-readable storage medium that is non-transitory and that is not a carrier wave. As an example, blocks may be provided as one or more modules, for example, such as the one or more modules 1197 of FIG. 11.

As an example, a method can include receiving sensor information from at least one sensor disposed in a downhole environment that includes an electric submersible pump operatively coupled to a power drive via a cable; receiving electrical information associated with transmission of power via the cable; and identifying a state of the electric submersible pump via an adaptive model of at least the cable and the electric submersible pump based at least in part on a portion of the sensor information and a portion of the electrical information. In such an example, the method can include assessing health status of at least one component of the electrical submersible pump based at least in part on the state (e.g., or states). As an example, a method can include predicting a lifespan of at least one component the electrical submersible pump based at least in part on a state.

As an example, a method can include receiving sensor information that is associated with gas-liquid slugging of fluid being pumped by the electric submersible pump. As an example, a method can include receiving electrical information that is associated loading of an electric motor of the electric submersible pump responsive to gas-liquid slugging of fluid being pumped by the electric submersible pump.

As an example, a method can include adapting an adaptive model based at least in part on information associated with a cable. As an example, a cable can receive power at a supply end and transmit the power to an electric motor of an electric submersible pump at a downhole end. In such an example, the cable may be a multiphase power cable where phases of the power transmitted from the supply end to the downhole end increase in asymmetry with respect to each other.

As an example, a cable may be a multiphase cable and an electric submersible pump can include a wye point (e.g., or an electric motor) where unbalance exists at the wye point.

As an example, a method can include receiving electrical information that is based at least in part on injecting a signal and transmitting the signal via a cable while transmitting power via the cable to an electric motor of an electric submersible pump.

As an example, electrical information can include one or more of estimated speed information for speed of an electric motor of an electric submersible pump, estimated torque information for torque of an electric motor of an electric submersible pump, estimated rotor flux information for rotor flux of a rotor of an electric motor of an electric submersible pump.

As an example, a method can include adjusting operation of an electric submersible pump based at least in part on a state. As an example, a method can include adjusting an operational schedule of a power drive based at least in part on a state.

As an example, a system can include a processor; memory operatively coupled to the processor; and one or more modules stored in the memory that include processor executable instructions where the instructions include instructions to instruct the system to receive sensor information from at least one sensor disposed in a downhole environment that includes an electric submersible pump operatively coupled to a power drive via a cable; receive electrical information associated with transmission of power via the cable; and identify a state of the electric submersible pump via an adaptive model of at least the cable and the electric submersible pump based at least in part on a portion of the sensor information and a portion of the electrical information. In such a system, instructions can be included to assess health status of at least one component of the electrical submersible pump based at least in part on the state and/or to predict a lifespan of at least one component the electrical submersible pump based at least in part on the state.

As an example, one or more computer-readable storage media that include processor-executable instructions can include instructions to instruct a computing system to: receive sensor information from at least one sensor disposed in a downhole environment that includes an electric submersible pump operatively coupled to a power drive via a cable; receive electrical information associated with transmission of power via the cable; and identify a state of the electric submersible pump via an adaptive model of at least the cable and the electric submersible pump based at least in part on a portion of the sensor information and a portion of the electrical information. In such an example, instructions can be included to inject (e.g., to call for injecting) a signal for transmission via the cable while transmitting power via the cable to an electric motor of the electric submersible pump.

As an example, one or more control modules (e.g., for a controller such as the controller 230, the controller 250, etc.) may be configured to control an ESP (e.g., a motor, etc.). As an example, one or more control modules may include circuitry (e.g., hardware, software or hardware and software) that can implement vector control. As an example, a module may include an input, an output and control logic, for example, that receives input and that outputs one or more control signals (e.g., data, etc.) based at least in part on the input and the control logic.

As an example, circuitry can include one or more levels of available integration, for example, from discrete logic circuits to VLSI. As an example, circuitry can include one or more programmable logic components programmed to perform one or more functions (e.g., of a system, a method, etc.). As an example, circuitry may include one or more general-purpose and/or special-purpose processors (e.g., programmed with instructions to perform one or more functions). As an example, circuitry may function according to one or more equations, which may include one or more state-space equations.

As an example, one or more methods may include associated computer-readable storage media (CRM) blocks. Such blocks can include instructions suitable for execution by one or more processors (or cores) to instruct a computing device or system to perform one or more actions. As an example, equipment may include a processor (e.g., a microcontroller, etc.) and memory as a storage device for storing processor-executable instructions. In such an example, execution of the instructions may, in part, cause the equipment to perform one or more actions (e.g., for control, sensing, telemetry, etc.).

According to an embodiment, one or more computer-readable media may include computer-executable instructions to instruct a computing system to output information for controlling a process. For example, such instructions may provide for output to a sensing process, an injection process, a drilling process, an extraction process, an extrusion process, a pumping process, a heating process, etc.

Figure 20:
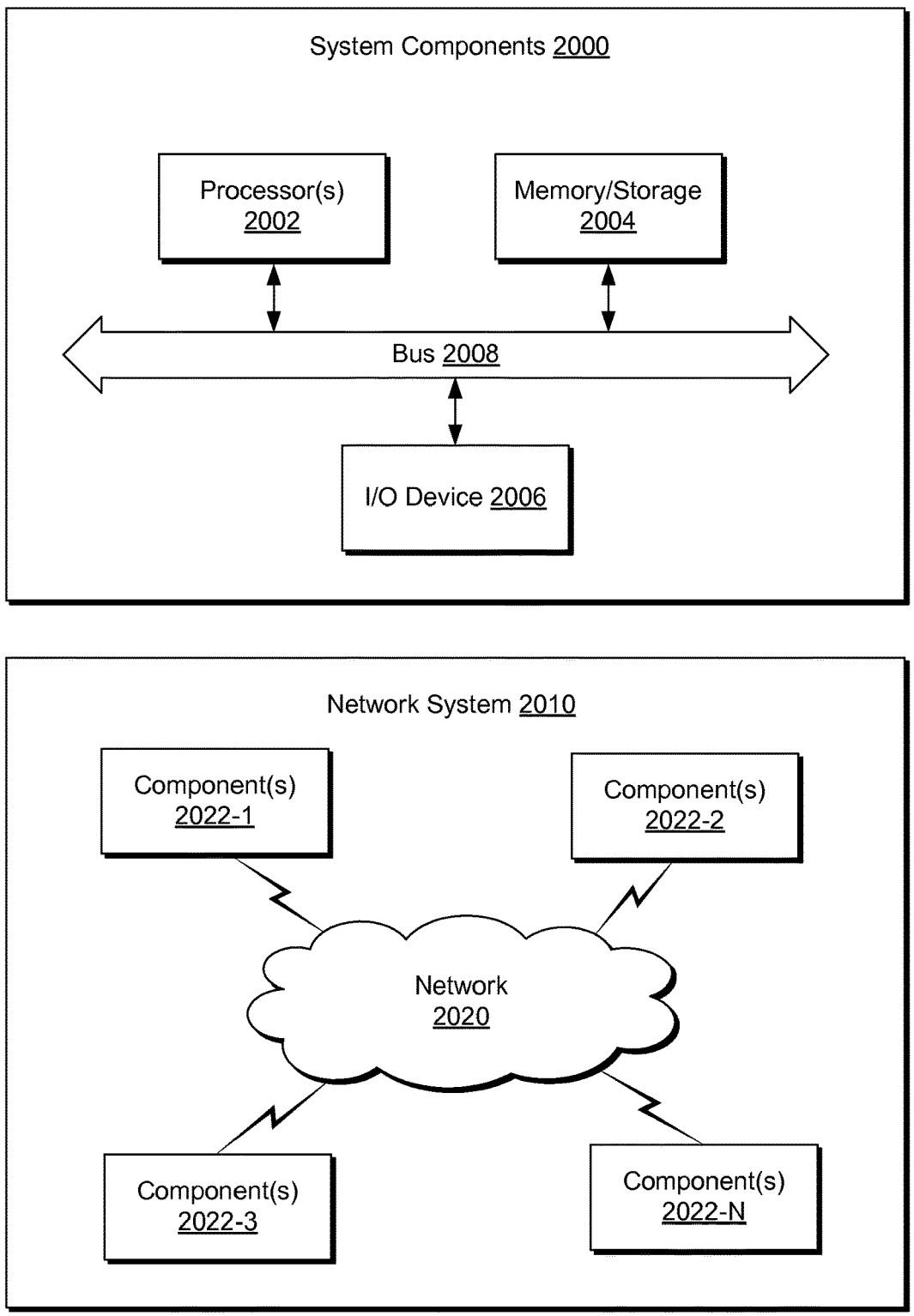
FIG. 20 illustrates example components of a system and a networked system.

FIG. 20 shows components of a computing system 2000 and a networked system 2010. The system 2000 includes one or more processors 2002, memory and/or storage components 2004, one or more input and/or output devices 2006 and a bus 2008. According to an embodiment, instructions may be stored in one or more computer-readable media (e.g., memory/storage components 2004). Such instructions may be read by one or more processors (e.g., the processor(s) 2002) via a communication bus (e.g., the bus 2008), which may be wired or wireless. The one or more processors may execute such instructions to implement (wholly or in part) one or more attributes (e.g., as part of a method). A user may view output from and interact with a process via an I/O device (e.g., the device 2006). According to an embodiment, a computer-readable medium may be a storage component such as a physical memory storage device, for example, a chip, a chip on a package, a memory card, etc.

According to an embodiment, components may be distributed, such as in the network system 2010. The network system 2010 includes components 2022-1, 2022-2, 2022-3, . . . 2022-N. For example, the components 2022-1 may include the processor(s) 2002 while the component(s) 2022-3 may include memory accessible by the processor(s) 2002. Further, the component(s) 2022-2 may include an I/O device for display and optionally interaction with a method. The network may be or include the Internet, an intranet, a cellular network, a satellite network, etc.

Conclusion

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method comprising:
receiving sensor information from at least one sensor disposed in a downhole environment that comprises an electric submersible pump wherein the electric submersible pump comprises a multi-phase electric motor operatively coupled to a power drive via circuitry, wherein the circuitry comprises a multi-phase cable,
wherein the multi-phase cable comprises multiple conductors each associated with a different phase,
wherein the multiple conductors of the multi-phase cable are connected to the multi-phase electric motor having a wye point that connects the different phases,
wherein the sensor information comprises temperature information and fluid flow information;
receiving electrical information associated with transmission of power to the multi-phase electric motor via the multiple conductors of the multi-phase cable each associated with the different phase;
identifying a state of the electric submersible pump via an adaptive model of at least (i) the multiple conductors of the multi-phase cable and (ii) the multi-phase electric motor of the electric submersible pump,
wherein the identifying the state is based at least in part on providing to the adaptive model at least a portion of the sensor information and a portion of the electrical information,
wherein the adaptive model models at least (i) impedance of the circuitry comprising the multiple conductors of the multi-phase cable, and (ii) impedance of the multi-phase electric motor,
wherein the modeled impedance modeled by the adaptive model further comprises a modeled nonlinearity of the multiple conductors of the multi-phase cable, the modeled nonlinearity corresponding to a nonlinearity of the multi-phase cable among the phases at the wye point,
wherein the modeled impedance models that the nonlinearity of the multi-phase cable among the phases at the wye point increases with increasing temperature as a result of heat transfer due to fluid flow such that a phase asymmetry at a power drive end of the multi-phase cable becomes more asymmetric at a multi-phase electric motor end of the multi-phase cable and causes an unbalance of the different phases at the wye point of the multi-phase electric motor; and
using the identified state, predicting a lifespan of at least one component of the electric submersible pump.

2. The method of claim 1 further comprising assessing health status of at least one component of the electric submersible pump based at least in part on the state.

3. The method of claim 1 wherein the sensor information comprises information associated with gas-liquid slugging of fluid being pumped by the electric submersible pump, wherein the gas-liquid slugging changes density of the fluid being pumped and thereby changes loading of the multi-phase electric motor and thereby changes the electrical information associated with the transmission of power to the multi-phase electric motor via the multi-phase cable.

4. The method of claim 1 wherein the electrical information comprises information associated loading of the multi-phase electric motor of the electric submersible pump responsive to gas-liquid slugging of fluid being pumped by the electric submersible pump.

5. The method of claim 1 further comprising adapting the adaptive model based at least in part on a portion of the electrical information associated with the multi-phase cable.

6. The method of claim 1 wherein the multi-phase cable receives power at a supply end via the power drive and transmits the power to the multi-phase electric motor of the electric submersible pump at a downhole end and
wherein the adaptive model models circuitry of the power drive.

7. The method of claim 6 wherein phases of the power transmitted from the supply end to the downhole end, via the multi-phase cable, increase in asymmetry with respect to each other.

8. The method of claim 1 wherein the electrical information is based at least in part on injecting a signal and transmitting the signal via the multi-phase cable to the multi-phase electric motor while transmitting power via the multi-phase cable to the multi-phase electric motor of the electric submersible pump.

9. The method of claim 1 wherein the electrical information comprises estimated speed information for speed of the multi-phase electric motor of the electric submersible pump.

10. The method of claim 1 wherein the electrical information comprises estimated torque information for torque of the multi-phase electric motor of the electric submersible pump.

11. The method of claim 1 wherein the electrical information comprises estimated rotor flux information for rotor flux of a rotor of the multi-phase electric motor of the electric submersible pump that accounts for phase asymmetry of the multi-phase cable.

12. The method of claim 1 further comprising adjusting operation of the electric submersible pump based at least in part on the state.

13. The method of claim 1 further comprising adjusting an operational schedule of the power drive based at least in part on the state.

14. The method of claim 1 wherein the at least one component of the electric submersible pump comprises a component of the multi-phase electric motor, a component of a fluid pump, a component of a protector, a component of a gauge, or a component of a sensor.

15. The method of claim 1 wherein the at least one component of the electric submersible pump comprises component circuitry powered by being operatively coupled to the wye point of the multi-phase electric motor.

16. The method of claim 1 wherein the circuitry comprises a line filter, wherein nonlinearity of the line filter increases with increasing temperature.

17. A system comprising:
a processor;
memory operatively coupled to the processor; and
one or more modules stored in the memory that comprise processor executable instructions wherein the instructions comprise instructions to instruct the system to
receive sensor information from at least one sensor disposed in a downhole environment that comprises an electric submersible pump wherein the electric submersible pump comprises a multi-phase electric motor operatively coupled to a power drive via circuitry, wherein the circuitry comprises a multi-phase cable,
wherein the multi-phase cable comprises multiple conductors each associated with a different phase,
wherein the multiple conductors of the multi-phase cable are connected to the multi-phase electric motor having a wye point that connects the different phases,
wherein the sensor information comprises temperature information and fluid flow information;
receive electrical information associated with transmission of power to the multi-phase electric motor via the multiple conductors of the multi-phase cable each associated with the different phase;
identify a state of the electric submersible pump via an adaptive model of at least (i) the multiple conductors of the multi-phase cable and (ii) the multi-phase electric motor of the electric submersible pump,
wherein the identifying the state is based at least in part on providing to the adaptive model at least a portion of the sensor information and a portion of the electrical information,
wherein the adaptive model models at least (i) impedance of the circuitry comprising the multiple conductors of the multi-phase cable, and (ii) impedance of the multi-phase electric motor,
wherein the modeled impedance modeled by the adaptive model further comprises a modeled nonlinearity of the multiple conductors of the multi-phase cable, the modeled nonlinearity corresponding to a nonlinearity of the multi-phase cable among the phases at the wye point,
wherein the modeled impedance models that the nonlinearity of the multi-phase cable among the phases at the wye point increases with increasing temperature as a result of heat transfer due to fluid flow such that a phase asymmetry at a power drive end of the multi-phase cable becomes more asymmetric at a multi-phase electric motor end of the multi-phase cable and causes an unbalance of the different phases at the wye point of the multi-phase electric motor; and
use the identified state to predict a lifespan of at least one component of the electric submersible pump.

18. The system of claim 17 further comprising instructions to assess health status of at least one component of the electric submersible pump based at least in part on the state.

19. One or more non-transitory computer-readable storage media that comprises processor-executable instructions wherein the instructions comprise instructions to instruct a computing system to:
- receive sensor information from at least one sensor disposed in a downhole environment that comprises an electric submersible pump wherein the electric submersible pump comprises a multi-phase electric motor operatively coupled to a power drive via circuitry, wherein the circuitry comprises a multi-phase cable, wherein the multi-phase cable comprises multiple conductors each associated with a different phase, wherein the multiple conductors of the multi-phase cable are connected to the multi-phase electric motor having a wye point that connects the different phases, wherein the sensor information comprises temperature information and fluid flow information;
- receive electrical information associated with transmission of power to the multi-phase electric motor via the multiple conductors of the multi-phase cable each associated with the different phase;
- identify a state of the electric submersible pump via an adaptive model of at least (i) the multiple conductors of the multi-phase cable and (ii) the multi-phase electric motor of the electric submersible pump,
- wherein the identifying the state is based at least in part on providing to the adaptive model at least a portion of the sensor information and a portion of the electrical information,
- wherein the adaptive model models at least (i) impedance of the circuitry comprising the multiple conductors of the multi-phase cable, and (ii) impedance of the multi-phase electric motor,
- wherein the modeled impedance modeled by the adaptive model further comprises a modeled nonlinearity of the multiple conductors of the multi-phase cable, the modeled nonlinearity corresponding to a nonlinearity of the multi-phase cable among the phases at the wye point,
- wherein the modeled impedance models that the nonlinearity of the multi-phase cable among the phases at the wye point increases with increasing temperature as a result of heat transfer due to fluid flow such that a phase asymmetry at a power drive end of the multi-phase cable becomes more asymmetric at a multi-phase electric motor end of the multi-phase cable and causes an unbalance of the different phases at the wye point of the multi-phase electric motor; and
- use the identified state to predict a lifespan of at least one component of the electric submersible pump.

20. The one or more non-transitory computer-readable storage media of claim 19 further comprising instructions to inject a signal for transmission to the multi-phase electric motor via the multi-phase cable while transmitting power via the multi-phase cable to the multi-phase electric motor of the electric submersible pump.

* * * * *